United States Patent
Thackeray et al.

(10) Patent No.: US 7,468,223 B2
(45) Date of Patent: Dec. 23, 2008

(54) LITHIUM METAL OXIDE ELECTRODES FOR LITHIUM CELLS AND BATTERIES

(75) Inventors: Michael M. Thackeray, Naperville, IL (US); Christopher S. Johnson, Naperville, IL (US); Khalil Amine, Oakbrook, IL (US)

(73) Assignee: UChicago Argonne, LLC, Chicago, IL (US)

( * ) Notice: Subject to any disclaimer, the term of this patent is extended or adjusted under 35 U.S.C. 154(b) by 389 days.

(21) Appl. No.: 11/271,462

(22) Filed: Nov. 10, 2005

(65) Prior Publication Data

US 2006/0099508 A1 May 11, 2006

Related U.S. Application Data

(60) Continuation-in-part of application No. 10/688,004, filed on Oct. 17, 2003, now Pat. No. 7,135,252, which is a division of application No. 09/989,844, filed on Nov. 21, 2001, now Pat. No. 6,680,143, which is a continuation-in-part of application No. 09/887,842, filed on Jun. 21, 2001, now Pat. No. 6,677,082.

(60) Provisional application No. 60/213,618, filed on Jun. 22, 2000.

(51) Int. Cl.
*H01M 4/58* (2006.01)

(52) U.S. Cl. .............. 429/231.1; 429/231.2; 429/231.3; 429/231.5; 429/221; 429/223; 429/224; 423/599

(58) Field of Classification Search .............. 429/231.1, 429/231.2, 231.3, 231.5, 221, 223, 224; 423/599
See application file for complete search history.

(56) References Cited

U.S. PATENT DOCUMENTS

| | | | |
|---|---|---|---|
| 5,393,622 A | 2/1995 | Nitta et al. | |
| 6,660,432 B2 | 12/2003 | Paulsen et al. | |
| 6,677,082 B2 | 1/2004 | Thackeray et al. | |
| 6,680,143 B2 | 1/2004 | Thackeray et al. | |
| 7,135,252 B2 * | 11/2006 | Thackeray et al. | 429/231.1 |

* cited by examiner

*Primary Examiner*—Laura S Weiner
(74) *Attorney, Agent, or Firm*—Olson & Cepuritis, Ltd.; Harry M. Levy; Robert J. Ross

(57) ABSTRACT

A lithium metal oxide positive electrode for a non-aqueous lithium cell is disclosed. The cell is prepared in its initial discharged state and has a general formula $xLiMO_2 \cdot (1-x)Li_2M'O_3$ in which $0<x<1$, and where M is one or more ion with an average trivalent oxidation state and with at least one ion being Mn or Ni, and where M' is one or more ion with an average tetravalent oxidation state. Complete cells or batteries are disclosed with anode, cathode and electrolyte as are batteries of several cells connected in parallel or series or both.

2 Claims, 18 Drawing Sheets

LITHIUM METAL OXIDE ELECTRODES FOR LITHIUM CELLS AND BATTERIES

RELATED APPLICATIONS

This application is a continuation-in-part application of application Ser. No. 10/688,004 filed Oct. 17, 2003, now U.S. Pat. No. 7,135,252, which is a divisional of application Ser. No. 09/989,844 filed Nov. 21, 2001, now U.S. Pat. No. 6,680,143, which is a continuation-in-part of application Ser. No. 09/887,842 filed Jun. 21, 2001, now U.S. Pat. No. 6,677,082 which claimed priority under 35 U.S.C. §1.78(a)(3) of provisional application Ser. No. 60/213,618 filed Jun. 22, 2000.

CONTRACTUAL ORIGIN OF THE INVENTION

The United States Government has rights in this invention pursuant to Contract No. W-31-109-ENG-38 between the U.S. Department of Energy (DOE) and The University of Chicago representing Argonne National Laboratory.

FIELD OF THE INVENTION

This invention relates to positive lithium metal oxide electrodes for lithium cells and batteries.

BACKGROUND OF THE INVENTION

This invention relates to lithium metal oxide positive electrodes for non-aqueous lithium cells and batteries. More specifically, it relates to lithium-metal-oxide electrode compositions and structures, having in their initial state in an electrochemical cell, a general formula $xLiMO_2 \cdot (1-x) Li_2M'O_3$ alternatively $Li_{2-x}M_xM'_{1-x}O_{3-x}$ in which $0<x<1$ and where M is one or more ion with an average oxidation state of three and with at least one ion being Mn, and where M' is one or more ions with an average oxidation state of four selected preferably from Mn, Ti and Zr; or, where M is one or more ion with an average oxidation state of three and with at least one ion being Ni, and where M' is one or more ions with an average oxidation state of four with at least one ion being Mn. In one embodiment of the invention, the Mn content should be as high as possible, such that the $LiMO_2$ component is essentially $LiMnO_2$ modified in accordance with this invention. In a second embodiment of the invention, the Ni content should be as high as possible such that the $LiMO_2$ component is essentially $LiNiO_2$ modified in accordance with this invention. In a further embodiment of the invention, the transition metal ions and lithium ions may be partially replaced by minor concentrations of one or more mono- or multivalent cations such as $H^+$ derived from the electrolyte by ion-exchange with $Li^+$ ions, and/or $Mg^{2+}$ and $Al^{3+}$ to impart improved structural stability or electronic conductivity to the electrode during electrochemical cycling.

Prior application Ser. No. 09/887,842 filed Jun. 21, 2001 taught one or more cations M or M' in a lithium metal oxide cathode, such as $LiMO_2$ or $Li_2M'O_3$ where M has an oxidation state or valence of three and M' has an oxidation state or valence of four. Although one of ordinary skill in the art would have clearly understood that the valences or oxidation states taught included ions which averaged oxidation state of three or average oxidation states of four, this continuation-in-part application explictily states what was understood from the earlier filed '842 application and adds newly obtained data.

SUMMARY OF THE INVENTION

Lithium-metal oxide compounds of general formula $LiMO_2$, where M is a trivalent transition metal cation such as Co, Ni, Mn, Ti, V, Fully executed, with a trivalent oxidation state and with electrochemically inactive substituents such as Al are very well known and are of interest as positive electrodes for rechargeable lithium batteries. The best-known electrode material is $LiCoO_2$, which has a layered-type structure and is relatively expensive compared to the isostructural nickel and manganese-based compounds. Efforts are therefore being made to develop less costly electrodes, for example, by partially substituting the cobalt ions within $LiCoO_2$ by nickel, such as in $LiNi_{0.8}Co_{0.2}O_2$ or by exploiting the manganese-based system $LiMnO_2$. Such layered compounds are sometimes stabilized by partially replacing the transition metal cations within the layers by other metal cations, either alone or in combination. For example, $Li^+$ and/or $Mg^{2+}$ ions may be introduced into the structure to improve the electronic conductivity of the electrode, or $Al^{3+}$ and/or $Ti^{4+}$ ions to improve the structural stability of the electrode at high levels of delithiation. Examples of such compounds are $LiNi_{0.8}Co_{0.15}Al_{0.05}O_2$ and $LiNi_{0.75}Co_{0.15}Ti_{0.05}Mg_{0.05}O_2$.

A major problem of layered $LiMO_2$ compounds containing either Co or Ni (or both) is that the transition metal cations, M, with a trivalent oxidation state are oxidized during charge of the cells to a metastable tetravalent oxidation state. Such compounds are highly oxidizing materials and can react with the electrolyte or release oxygen. These electrode materials can, therefore, suffer from structural instability in charged cells when, for example, more than 50% of the lithium is extracted from their structures; they require stabilization to combat such chemical degradation.

Although the layered manganese compound $LiMnO_2$ has been successfully synthesized in the laboratory, it has been found that delithiation of the structure and subsequent cycling of the $Li_xMnO_2$ electrode in electrochemical cells causes a transition from the layered $MnO_2$ configuration to the configuration of a spinel-type $[Mn_2]O_4$ structure. This transformation changes the voltage profile of the $Li/Li_xMnO_2$ cell such that it delivers capacity over both a 4V and a 3V plateau; cycling over the 3V plateau is not fully reversible which leads to capacity fade of the cell over long-term cycling. Other types of $LiMnO_2$ structures exist, such as the orthorhombic-form, designated $O—LiMnO_2$ in which sheets of $MnO_6$ octahedra are staggered in zig-zig fashion unlike their arrangement in layered $LiMnO_2$. However, $O—LiMnO_2$ behaves in a similar way to layered $LiMnO_2$ in lithium cells; it also converts to a spinel-like structure on electrochemical cycling.

It is an object of the present invention to provide a lithium metal oxide positive electrode for a non-aqueous lithium cell prepared in its initial discharged state having a general formula $xLiMO_2 \cdot (1-x) Li_2M'O_3$ in which $0<x<1$, and where M is three or more ions including Mn, Co, and Ni with an average oxidation state of three and in which the Mn:Ni ratio is 1:1 or the Mn:Co ratio is 1:1 and M' is one or more ions having an average oxidation state of four with both the $LiMO_2$ and $Li_2M'O_3$ components being layered and the ratio of Li to M and M' being greater than one and less than two.

Another object of the invention is to provide an electrochemical cell having a negative electrode and a non-aqueous electrolyte and a positive electrode, the positive electrode having in its initial discharged state, a general formula $xLiMO_2 \cdot (1-x) Li_2M'O_3$ in which $0<x<1$, and where M is three or more ions including Mn, Co, and Ni with an average oxidation state of three, and in which the Mn:Ni ratio is 1:1 or the Mn:Co ratio is 1:1, and M' is one or more ions having an average oxidation state of four with both the $LiMO_2$ and $Li_2M'O_3$ components being layered and the ratio of Li to M and M' being greater than one and less than two.

A final object of the invention is to provide a battery consisting of a plurality of cells, at least some cells including a negative electrode and a non-aqueous and a positive electrode, the positive electrode in its initial discharged state, a general formula $xLiMO_2 \cdot (1-x)Li_2M'O_3$ in which $0<x<1$, and where M is three or more ions including Mn, Co, and Ni with an average oxidation state of three, and in which the Mn:Ni ratio is 1:1 or the Mn:Co ratio is 1:1, and M' is one or more ions having an average oxidation state of four with both the $LiMO_2$ and $Li_2M'O_3$ components being layered and the ratio of Li to M and M' being greater than one and less than two.

Therefore, further improvements must be made to $LiMO_2$ electrodes, particularly $LiMnO_2$ and $LiNiO_2$, to impart greater structural stability to these electrode materials during electrochemical cycling in lithium cells and batteries. This invention addresses the stability of $LiMO_2$ electrode structures, particularly those in which M is Mn and Ni, and makes use of a $Li_2M'O_3$ component in which M' is one or more ions with an average oxidation state of four to improve their stability.

BRIEF DESCRIPTION OF THE DRAWINGS

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

DETAILED DESCRIPTION OF THE PREFERRED EMBODIMENTS

Figure 1:
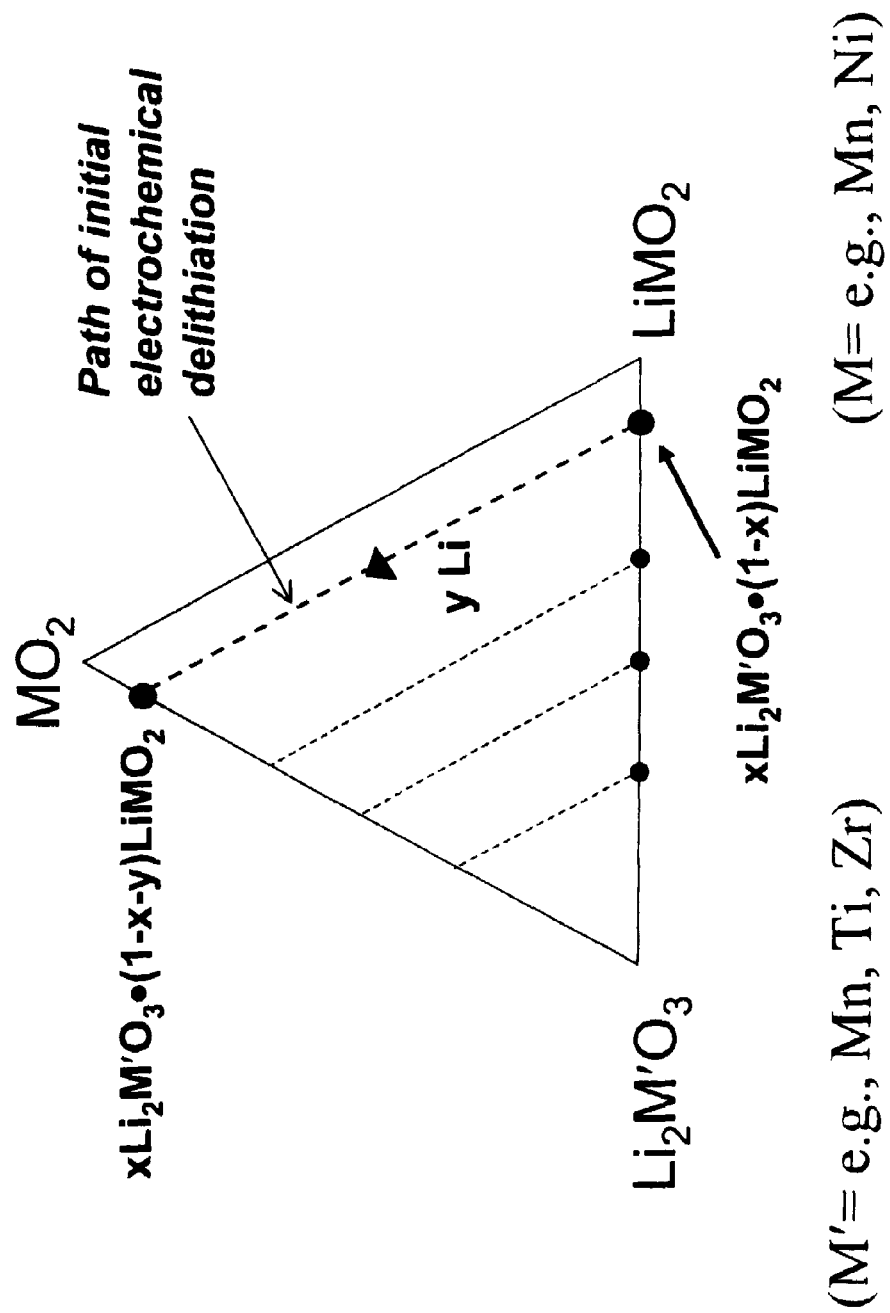
FIG. 1 depicts a schematic representation of a $Li_2M'O_3$—$MO_2$—$LiMO_2$ phase diagram, in which M (in the $LiMO_2$ component) is one or more ions with an average oxidation state of three, and in which M' (in the $Li_2M'O_3$ component) is one or more ions with an average oxidation state of four.

This invention relates to stabilized $LiMO_2$ electrodes whereby an electrochemically inert rocksalt phase $Li_2MO_3$ is introduced as a component to the overall electrode structure as defined, in its initial state, by the general formula $xLiMO_2 \cdot (1-x)Li_2M'O_3$ alternatively $Li_{2-x}M_xM'_{1-x}O_{3-x}$ in which $0<x<1$, preferably $0.8 \leq x<1$, and more preferably $0.9 \leq x<1$, and where M is one or more ion with an average oxidation state of three and having at least one ion selected from Mn and where M' is one or more ions with an average oxidation state of four selected preferably from Mn, Ti and Zr, or alternatively, where M is one or more ion with an average oxidation state of three and having at least one ion selected from Ni and where M' is one or preferably more ions with an average oxidation state of four having at least one ion selected from Mn. These compounds can be visualized as lying on the $LiMO_2$—$Li_2M'O_3$ tie-line of the $Li_2M'O_3$—$MO_2$—$LiMO_2$ phase diagram shown schematically in FIG. 1.

From a consideration of charge balance, because lithium and oxygen ions are monovalent (+1) and divalent (−2), respectively, it necessitates that when the M cations are of one type such as in $LiMnO_2$, $LiCoO_2$ and $LiNiO_2$, the oxidation state of the M cations must be trivalent. However, it stands to reason that when two or more M cations reside in the $LiMO_2$ structure, the oxidation state of the M cations may either be all trivalent, or they may be of mixed valence such that the average oxidation state of the M cations overall is three or trivalent. Examples of the latter case would, in principle, be 1) $Li(Mn_{0.5}Ni_{0.5})O_2$ if the oxidation state of the Mn ions is tetravalent and the oxidation state of the Ni ions is divalent, as is the case for the lithium-manganese-nickel-oxide spinel $Li[Mn_{1.5}Ni_{0.5}]O_4$; 2) $Li(Mn_{0.4}Ni_{0.4}Al_{0.2})O_2$ if the oxidation state of the Mn ions is four or tetravalent, the oxidation state of the Ni ions is divalent, and the oxidation state of the Al ions is trivalent; 3) $Li(Mn_{0.4}Ni_{0.4}Li_{0.2})O_2$ if the Mn ions are tetravalent, the Ni ions are trivalent and the Li ions are monovalent; and 4) $Li(Mn_{0.5}Ni_{0.4}Li_{0.1})O_2$ if the Mn ions are tetravalent, the Li ions are monovalent, and if 0.1 Ni ions are trivalent and 0.3 Ni ions are divalent.

The rocksalt phase $Li_2MnO_3$ has a layered-type structure in which discrete layers of lithium ions alternate with layers containing Mn and Li ions (in a 2:1 ratio) between the close-packed oxygen sheets. Note that, in this respect, the formula $Li_2MnO_3$ can be written in layered notation as $Li(Mn_{2/3}Li_{1/3})O_2$, in which the Li and Mn within round brackets represent the ions in one layer. A difference between $Li_2MnO_3$ and the layered $LiMO_2$ compounds is that the Mn ions in $Li_2MnO_3$ are tetravalent and cannot be easily electrochemically oxidized by lithium extraction, whereas in the $LiMO_2$ compounds the transition metal cations M are trivalent and can be electrochemically oxidized. Because $Li_2MnO_3$ has a rocksalt phase, there is no energetically favorable interstitial space for additional lithium; therefore, $Li_2MnO_3$ cannot operate as an insertion electrode and cannot be electrochemically reduced. The $xLiMO_2.(1-x)Li_2M'O_3$ structure may be either a solid solution of the two components or a domain structure with a common oxygen array for both the $LiMO_2$ and $Li_2MnO_3$ components, but in which the cation distribution can vary such that domains of the two components exist side by side. Such a solid solution or domain structure does not rule out the possibility of cation mixing and structural disorder, particularly at domain or grain boundaries. In a generalized $xLiMO_2.(1-x)Li_2M'O_3$ layered structure, one layer contains M, M' and Li ions between sheets of close-packed oxygen ions, whereas the alternate layers are occupied essentially by lithium ions alone. By analogy, in a $xLiMO_2.(1-x)Li_2M'O_3$ structure that contains monoclinic $LiMnO_2$ as the $LiMO_2$ component, it is believed that the tetravalent M' ions can partially occupy the M positions in the monoclinic layered $LiMnO_2$ structure, thereby providing increased stability to the overall structure.

In a further embodiment of the invention, from the foregoing arguments, it stands to reason that the lithium and the tetravalent M' ions in the $Li_2M'O_3$ component of the $xLiMO_2.(1-x)Li_2M'O_3$ structure can be partially replaced by other monovalent or tetravalent cations. Of particular significance to the invention is the replacement of Mn in an $Li_2Mn_2O_3$ component by Ti or Zr which are known to form isostructural compounds $Li_2TiO_3$ and $Li_2ZrO_3$, respectively; such components are expected to enhance the structural stability of the $xLiMO_2.(1-x)Li_2M'O_3$ electrode. Furthermore, it stands to reason that the lithium and M' ions in the $Li_2M'O_3$ component of the $xLiMO_2.(1-x)Li_2M'O_3$ structure can be partially replaced by other monovalent, or multivalent ions, such that the substitution maintains charge neutrality, thereby introducing electrochemical activity to the $Li_2M'O_3$ component and giving it $LiMO_2$-type characteristics; in principle, examples of such components are 1) $Li_{1.8}Mn_{0.9}Ni_{0.3}O_3$, written alternatively in $LiMO_2$ form as $Li(Mn_{0.6}Ni_{0.2}Li_{0.2})O_2$, in which the lithium ions are monovalent, the manganese ions are tetravalent, and the nickel ions are divalent which can be electrochemically oxidized to the tetravalent state in a lithium cell; and 2) $Li_{1.9}Mn_{0.9}Ni_{0.2}O_3$, written alternatively in $LiMO_2$ form as $Li(Mn_{0.60}Ni_{0.13}Li_{0.27})O_2$, in which the lithium ions are monovalent, the manganese ions are tetravalent, and the nickel ions are 50% divalent and 50% trivalent, all of which can be electrochemically oxidized to the tetravalent state in a lithium cell.

In the electrodes of the present invention, the M and M' ions can be disordered in the electrode structure. It is preferable that the Mn content should be as high as possible, such that the $LiMO_2$ component is essentially $LiMnO_2$. In a further embodiment of the invention, the Ni content should be as high as possible such that the $LiMO_2$ component is essentially $LiNiO_2$ modified in accordance with the invention. In yet a further embodiment of the invention, the transition metal ions and lithium ions may be partially replaced by minor concentrations (typically less than 10 atom percent) of other mono- or multivalent cations such as $Li^+$, $Mg^{2+}$ or $Al^{3+}$ to impart improved structural stability or electronic conductivity to the electrode during electrochemical cycling. In addition, the $xLiMO_2.(1-x)Li_2M'O_3$ structures of the invention may include $H^+$ ions, for example, resulting from the removal acidic $H^+$ species from the electrolyte by ion-exchange with $Li^+$ ions. It stands to reason, therefore, that the present invention includes the introduction of mono- or divalent cations into the structure, and that the electrodes of the invention may therefore depart slightly from the ideal stoichiometry as defined by the formula $xLiMO_2.(1-x)Li_2M'O_3$.

It has been shown in the past that $Li_2MnO_3$ (and isostructural $Li_2Mn_{1-x}Zr_xO_3$) which is electrochemically inactive, can be used as a precursor material to form an electrochemically active charged $xMnO_2.(1-x)Li_2MnO_3$ electrode structure in which x is approximately equal to 0.91; this value of x translates to a composition of the layered structure $Li_{1.1}Mn_{0.9}O_2$. These charged $xMnO_2.(1-x)Li_2MnO_3$ compounds have been prepared by leaching $Li_2O$ from the $Li_2MnO_3(Li_2O.MnO_2)$ structure with acid such as sulphuric acid (U.S. Pat. No. 5,153,081). However, the acid treatment causes a shear of the oxygen array, such that the resulting $xMnO_2.(1-x)Li_2MnO_3$ structures are no longer close-packed but have an oxygen arrangement that provides octahedral and trigonal prismatic sites in alternate layers. During relithiation, for example with LiI in acetonitrile, it has been demonstrated that the oxygen sheets shear back to close-packing and that the phase transformation yields a $xLiMnO_2.(1-x)Li_2MnO_3$-type structure. However, such phase transformations are undesirable in rechargeable battery systems, because they can adversely affect the efficiency and rechargeability of the electrode. Thus, a major advantage of this invention is that this phase transformation can be avoided by starting directly with a discharged $xLiMnO_2.(1-x)Li_2MnO_3$ electrode in the cell because the non-aqueous removal of lithium does not appear to cause the phase transition to yield the structure (non close-packed) generated by acid leaching of $Li_2MnO_3$.

Figure 2:
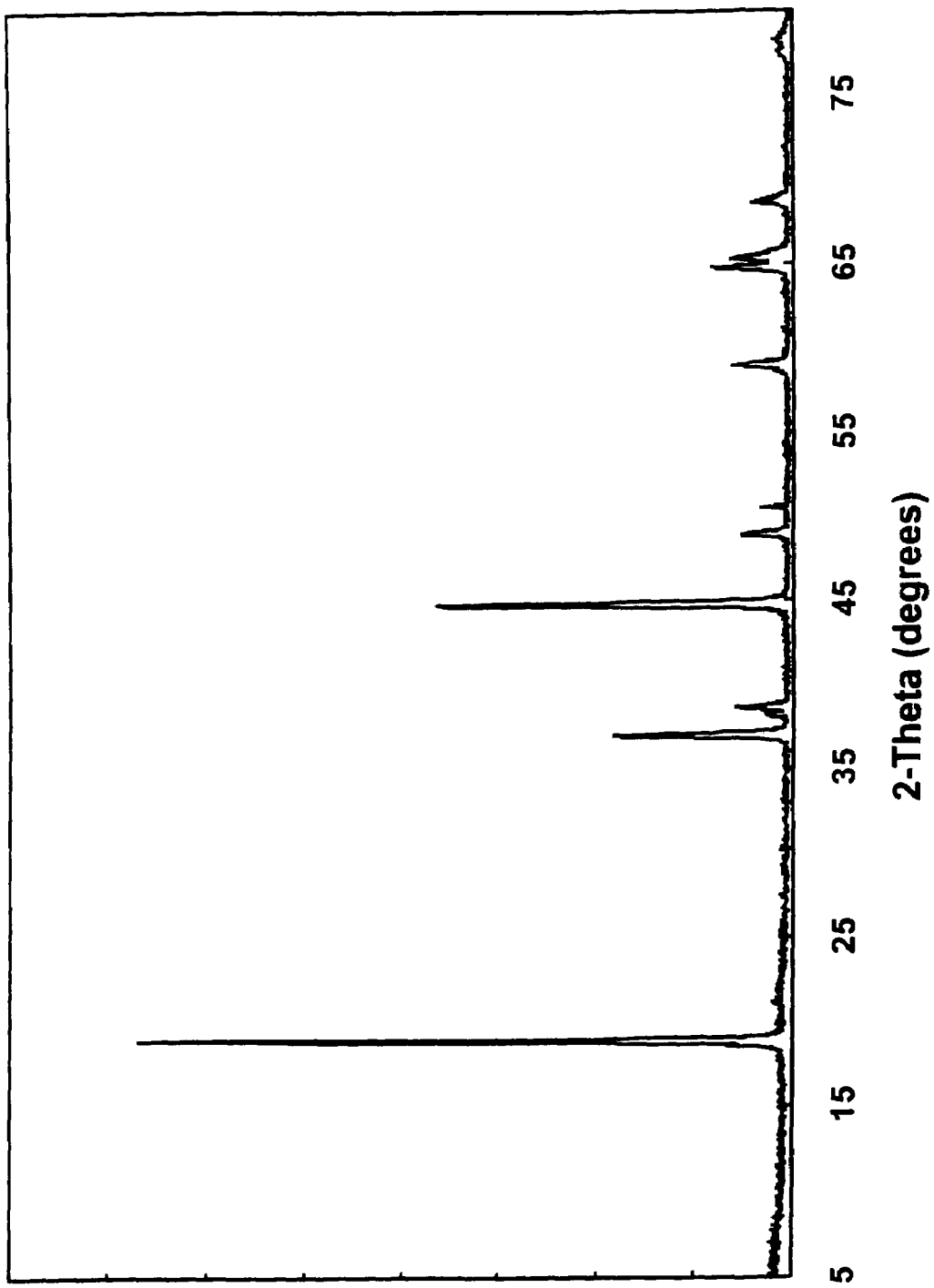
FIG. 2 depicts the X-ray diffraction pattern of a $xLi_2MnO_3 \cdot (1-x)LiNi_{0.8}Co_{0.2}O_2$ electrode composition.
Figure 3:
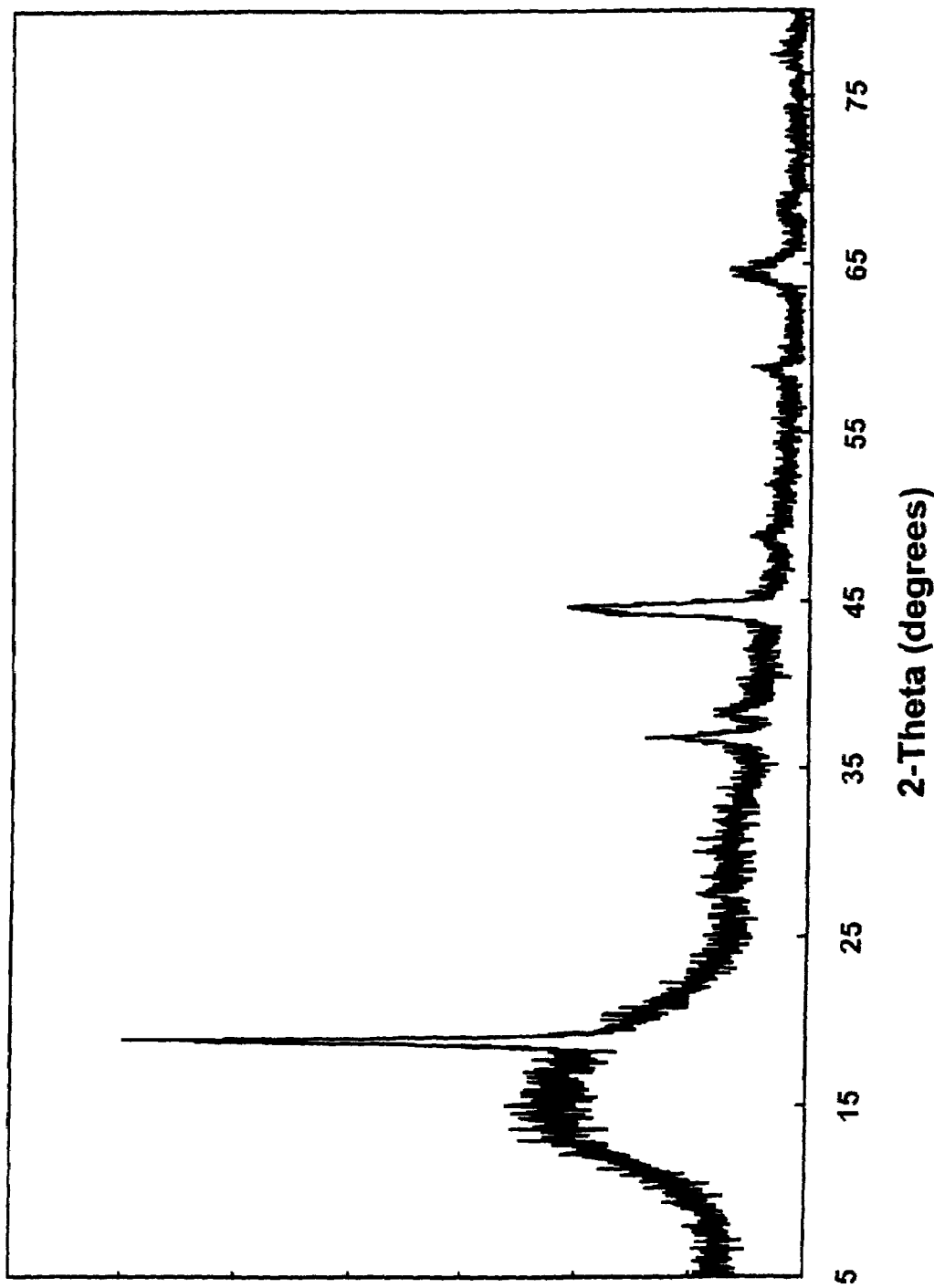
FIG. 3 depicts the X-ray diffraction pattern of a $xLi_2Mn_{1-x}Ti_xO_3 \cdot (1-x)LiNi_{0.8}Co_{0.2}O_2$ electrode composition.
Figure 4:
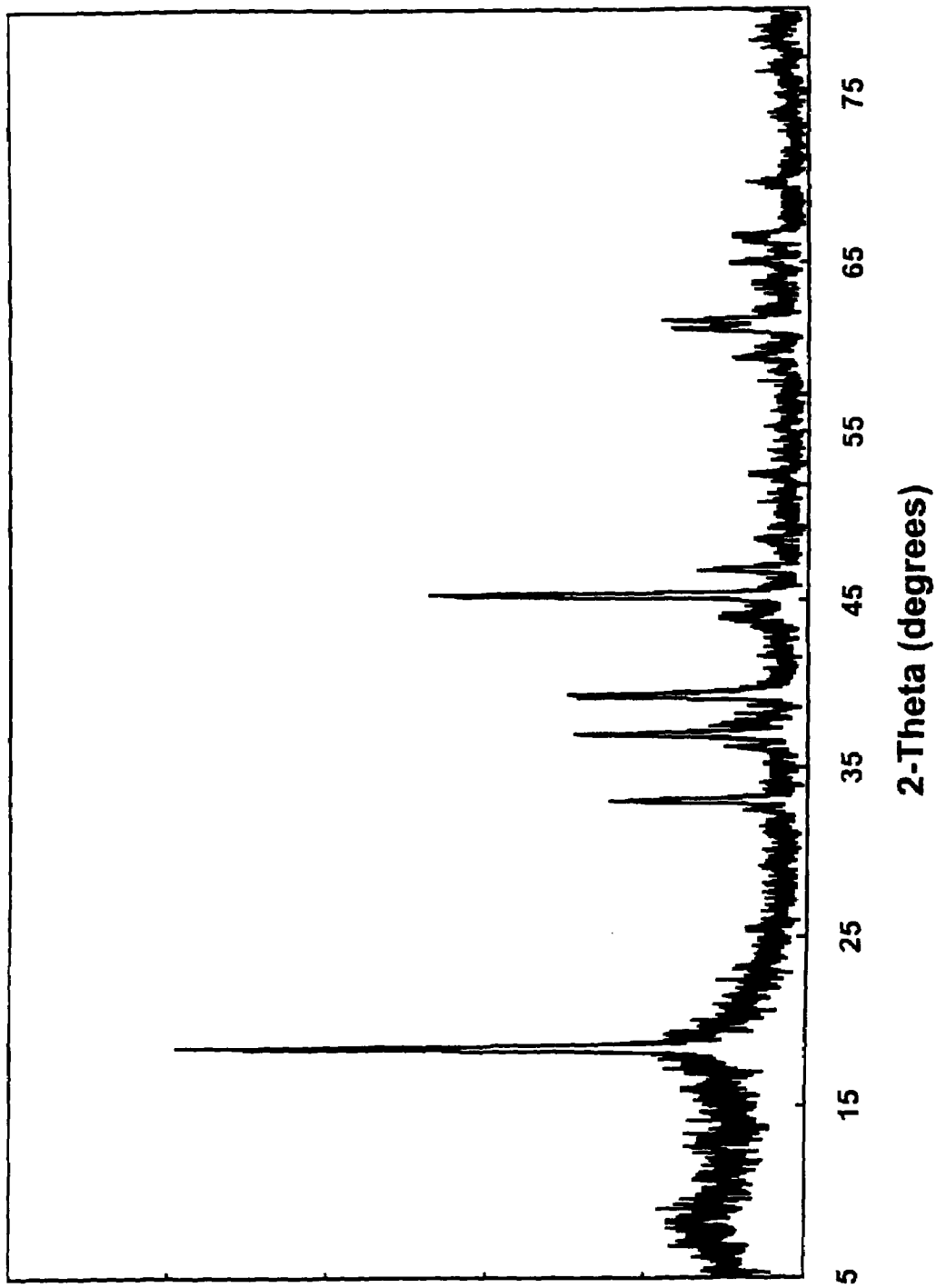
FIG. 4 depicts the X-ray diffraction pattern of a $xLi_2TiO_3 \cdot (1-x)LiMnO_2$ electrode composition.

Furthermore, it is important to note that even though the relithiation of a $xMnO_2.(1-x)Li_2MnO_3$ electrode of the prior art in an electrochemical cell yields the same formulation as the electrodes of the present invention, i.e., $xLiMnO_2.(1-x)Li_2MnO_3$, the applicants believe that the structures of the electrode materials of the present invention are significantly different from those of the prior art and will be unequivocally distinguished from one another by high-resolution transmission electron microscopy, i.e., differences will be evident in the microstructural features of the $xLiMnO_2.(1-x)Li_2MnO_3$ electrodes of the present invention and those of the prior art. For example, because the lithiated $xLiMnO_2.(1-x)Li_2MnO_3$ electrode structures of the prior art are derived from a non-close-packed $xMnO_2.(1-x)Li_2MnO_3$ structure, which is obtained by the acid leaching of, and $Li_2O$ removal from, a $Li_2MnO_3$ precursor as described above, the microstructures of the prior art electrode materials will be characterized by high concentrations of defects and stacking faults, as is evident by the broad peaks in their X-ray diffraction patterns, in contrast to the electrode materials of the present invention that are more crystalline and ordered as reflected by the relatively sharp and well-resolved peaks in their X-ray diffraction patterns (FIGS. 2, 3 and 4).

Another disadvantage of the acid-treated compounds of the prior art ('081 patent) $xMnO_2.(1-x)Li_2MnO_3$, is that they represent charged positive electrodes, whereas lithium-ion batteries require positive electrodes in the discharged state, for example, $LiMO_2$ electrodes (M=Co, Ni, Mn). Moreover, the charged $xMnO_2.(1-x)Li_2MnO_3$ electrodes of the prior art require dehydration before use so that they can be used effectively in lithium cells. By contrast, the $xLiMnO_2.(1-x)Li_2MnO_3$ electrodes of this invention are prepared in the discharged state and are essentially anhydrous materials and are more stable to heat-treatment and long-term storage in air compared to the $xMnO_2.(1-x)Li_2MnO_3$ materials of the prior art, which are known to transform on storage to a gamma-$MnO_2$-type structure as reported by Johnson et al in J. Power Sources 81-82, 491 (1999).

In one embodiment, this invention extends to include $xLiMO_2 \cdot (1-x)Li_2M'O_3$ electrodes stabilized by isostructural rocksalt $Li_2M'O_3$ compounds other than M'=Mn, Ti, Zr as described in the preceding sections. Examples of such compounds are $Li_2RuO_3$, $Li_2ReO_3$, $Li_2IrO_3$, and $Li_2PtO_3$ which may contribute a portion of the electrochemical capacity of the electrode.

One of the difficulties that has been encountered in synthesizing $xLiMO_2 \cdot (1-x)Li_2M'O_3$ electrodes, in which M is Mn, has been to keep the valency of the manganese ions equal, or close to its trivalent state. This has been successfully accomplished by the inventors with a hydrothermal method or process under basic conditions using LiOH and/or KOH. This invention, therefore, extends to include a hydrothermal process or method for synthesizing $xLiMO_2 \cdot (1-x)Li_2M'O_3$ compounds in which M is one or more trivalent ion with at least one ion being Mn, and in which M' is a tetravalent ion. Such methods of synthesis are undertaken in a pressurized autoclave, preferably between 5 and 35 atmospheres and at temperatures ranging between 100 and 250° C. and most preferably at 10-20 atm and temperatures between 180 and 230° C. for about 6 to 12 hours or more if necessary. For example, $0.15LiMnO_2 \cdot 85Li_2TiO_3$ electrodes have been successfully prepared by this process from precursor materials consisting of manganese oxide ($Mn_2O_3$), lithium hydroxide ($LiOH \cdot H_2O$) and titanium isopropoxide ($Ti[OCH(CH_3)_2]_4$) in a potassium hydroxide (KOH) solution at 220° C. and at 15 atmospheres pressure.

It has been recently demonstrated that layered lithium-chromium-manganese-oxide and lithium-cobalt-manganese-oxide electrodes of general formula $xLiCrO_2 \cdot (1-x)Li_2MnO_3$ and $xLiCoO_2 \cdot (1-x)Li_2MnO_3$ provide electrochemical stability when cycled between 4.5 and 2.0 V in electrochemical lithium cells. In particular, a $Li(Cr_{0.4}Mn_{0.4}Li_{0.2})O_2$ electrode (alternatively, $0.4LiCrO_2 \cdot 0.4Li_2MnO_3$) delivers approximately 150 mAh/g at 25° C. and 200 mAh/g at 55° C. at an average cell voltage of 3.5 V vs. Li. However, because the $Li_2MnO_3$ component is electrochemically inactive, the electrochemical capacity derived from the cell is due to the oxidation of $Cr^{3+}$ to $Cr^{6+}$ during the electrochemical charging of the cells. This system has an immediate disadvantage because it is known that the high oxidation states of chromium such as those found in $Cr_3O_8$ are dangerous and are a major health hazard whereas the electrodes of the present invention operate predominantly off a $M^{3+}/M^{4+}$ couple, notably a $Mn^{3+/4+}$ couple. For the cobalt compound, $xLiCoO_2 \cdot (1-x)Li_2MnO_3$, no significant advantage is gained in overcoming the cost limitations of the electrode because the cobalt ions, not the manganese ions, provide all the electrochemical capacity of the electrode.

The following examples of stabilized $xLiMnO_2 \cdot (1-x)Li_2MnO_3$ electrodes and $LiMO_2$ and $Li_2M'O_3$ components containing either manganese and/or nickel describe the principles of the invention as contemplated by the inventors, but they are not to be construed as limiting examples.

EXAMPLE 1

The electrode material $0.2Li_2MnO_3 \cdot 0.8LiNi_{0.8}Co_{0.2}O_2$ that can be written, alternatively, as $Li(Ni_{0.58}Mn_{0.18}Co_{0.15}Li_{0.09})O_2$ was prepared by the reaction of $Ni(NO_3)_2$, $Co(NO_3)_2$, $MnO_2$, and LiOH in the required stoichiometric amounts at 800° C. in air or oxygen for about 16 hours. The powder X-ray diffraction pattern of this compound indicates an essentially single-phase product with a layered-type structure (FIG. 2).

EXAMPLE 2

The electrode material $0.2Li_2Mn_{1-x}Ti_xO_3 \cdot 0.8LiNi_{0.8}Co_{0.2}O_2$, where x=0.5, which can be written, alternatively, as $Li(Ni_{0.58}Mn_{0.09}Ti_{0.09}Co_{0.15}Li_{0.09})O_2$ was prepared by the reaction of $Ni(NO_3)_2$, $Co(NO_3)_2$, $MnO_2$, $TiO_2$ (anatase) and LiOH in the required stoichiometric amounts at 800° C. in air or oxygen for about 16 hours. The powder X-ray diffraction pattern of this compound indicates an essentially single-phase product with a layered-type structure (FIG. 3).

EXAMPLE 3

The electrode material $0.15Li_2TiO_3 \cdot 0.85LiMnO_2$ that can be written, alternatively, as $Li(Ti_{0.14}Mn_{0.79}Li_{0.07})O_2$ was prepared by the hydrothermal reaction of $Mn_2O_3$, $TiO_2$ (anatase) and LiOH in the required stoichiometric amounts at 220° C. and 15 atmospheres pressure for about 10 hours. The powder X-ray diffraction pattern of this compound indicates an essentially single-phase product with a layered-type structure (FIG. 4).

EXAMPLE 4

Figure 5:
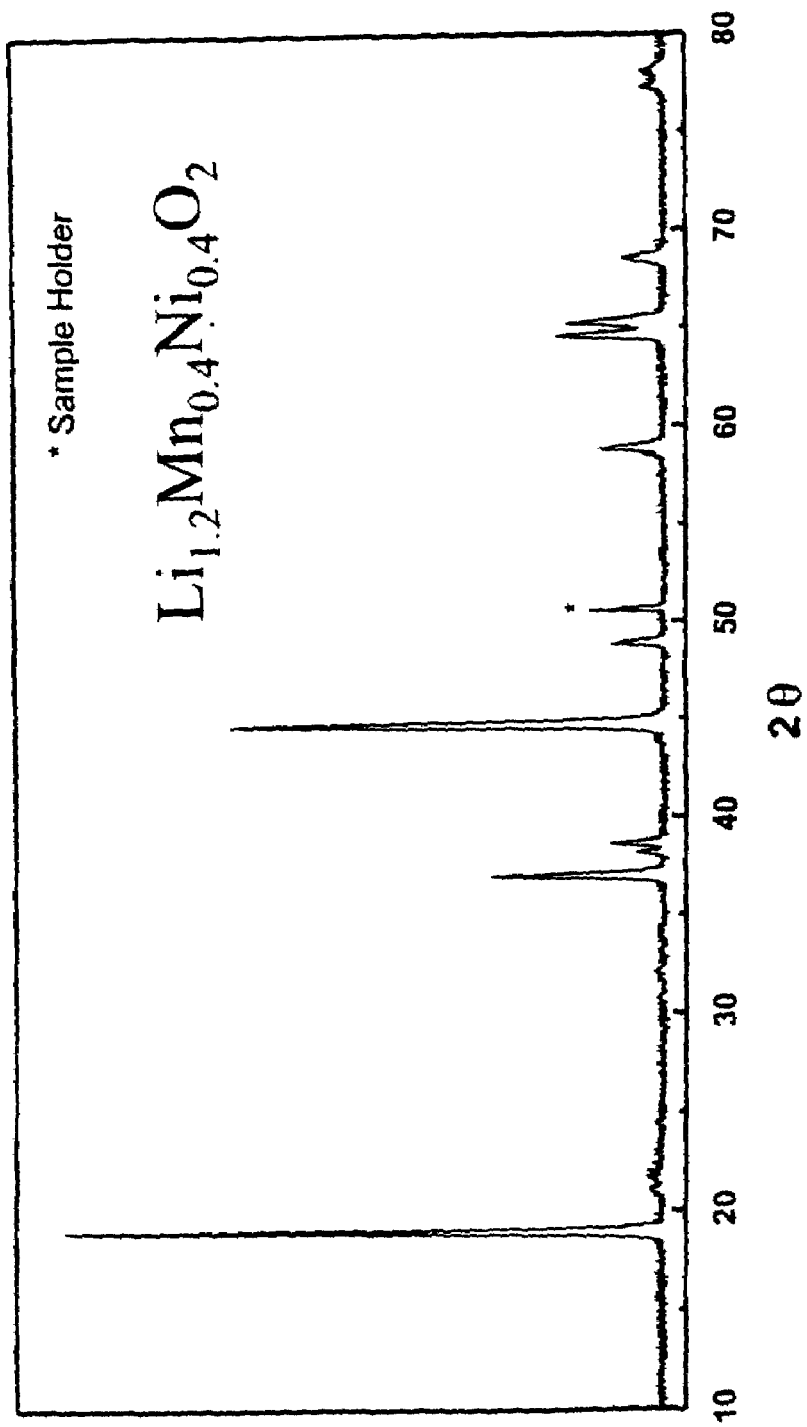
FIG. 5 depicts the X-ray diffraction pattern of a $Li_{1.2}Ni_{0.4}Mn_{0.4}O_2$ electrode component composition.

The electrode component material $Li_{1.2}Mn_{0.4}Ni_{0.4}O_2$ that can be written, alternatively, in $LiMO_2$ form as $Li(Mn_{0.4}Ni_{0.4}Li_{0.2})O_2$ in which the Mn ions are tetravalent, the Ni ions are trivalent and the Li ions are monovalent was prepared by the reaction of $Mn_{0.5}Ni_{0.5}(OH)_2$, and $LiOH \cdot H_2O$ in the required stoichiometric amounts in pelletized form, first at 480° C. for 12 hours and thereafter at 950° C. for 10 hours. The sample was then quenched in air to room temperature and ground into a powder. The powder X-ray diffraction pattern of this compound, in which the average oxidation state of all the M ions ($Mn_{0.4}Ni_{0.4}Li_{0.2}$) is trivalent, indicates an essentially single-phase product with a layered-type structure (FIG. 5).

EXAMPLE 5

Figure 6:
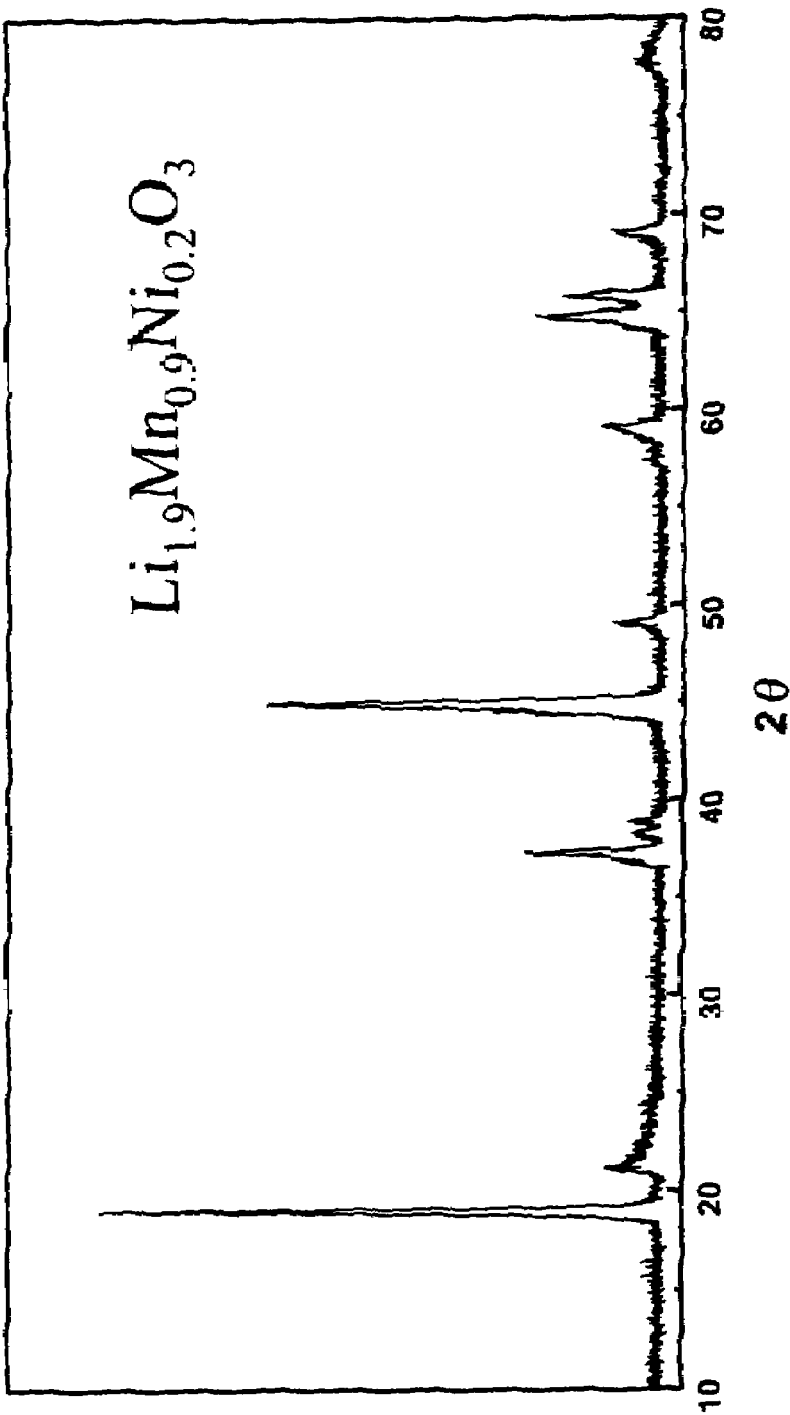
FIG. 6 depicts the X-ray diffraction pattern of a $Li_{1.9}Mn_{0.9}Ni_{0.2}O_3$ electrode component composition.

The electrode component material $Li_{1.9}Mn_{0.9}Ni_{0.2}O_3$ that can be written, alternatively, in $LiMO_2$ form as $Li(Mn_{0.60}Ni_{0.13}Li_{0.27})O_2$ in which the Li ions are monovalent, the Mn ions are tetravalent, and the Ni ions are 50% divalent and 50% trivalent, was prepared by the reaction of MnOOH, $Ni(OH)_2$, and $LiOH \cdot H_2O$ in the required stoichiometric amounts in pelletized form, first at 480° C. for 12 hours and thereafter at 950° C. for 10 hours. The sample was then quenched in air to room temperature and ground into a powder. The powder X-ray diffraction pattern of this compound in which the average oxidation state of all the M ions ($Mn_{0.60}Ni_{0.13}Li_{0.27}$) is trivalent, indicates an essentially single-phase product with a layered-type structure (FIG. 6).

EXAMPLE 6

The $xLiMO_2 \cdot (1-x)Li_2M'O_3$ electrode materials in Examples 1, 2 and 3 were evaluated in coin cells (size 2032) 20 mm diameter and 3.2 mm high against a counter lithium electrode. The cells had the configuration: $Li/1M\ LiPF_6$ in ethylene carbonate (EC), diethyl carbonate (DEC) (1:1)electrolyte/$xLiMO_2 \cdot (1-x)Li_2M'O_3$, in which the $xLiMO_2 \cdot (1-x)Li_2M'O_3$ electrode consisted of $0.2Li_2MnO_3 \cdot 0.8LiNi_{0.8}Co_{0.2}O_2$ or $0.15Li_2TiO_3 \cdot 0.85LiMnO_2$. Other electrolytes well known in the art may be used. Laminated electrodes were made containing approximately 7 to 10 mg of the $xLiMO_2 \cdot (1-x)Li_2M'O_3$ powder, i.e., approximately 82% by weight of the laminate electrode, intimately mixed with approximately 10% by weight of a polyvinylidene difluoride (Kynar PVDF polymer binder) and approximately 8% by weight of a suitable carbon (i.e. graphite, such as Timcal SFG-6, or acetylene black, such as Chevron XC-72) in 1-methyl-2-pyrrolidinone (NMP). Other binders are well known in the art and may be substituted here. The slurries were coated with a doctor blade onto an aluminum foil substrate current collector. The coatings were dried in vacuum at temperatures from 70° C. for about 12 hours, and punched out as electrode laminates. Metallic lithium foil was used as the counter electrode. Li/xLiMO$_2$.(1−x)Li$_2$M'O$_3$ cells were discharged and charged at constant current (typically 0.1 mA/cm$^2$) within the voltage range 4.5 to 2.0 V.

Figure 7:
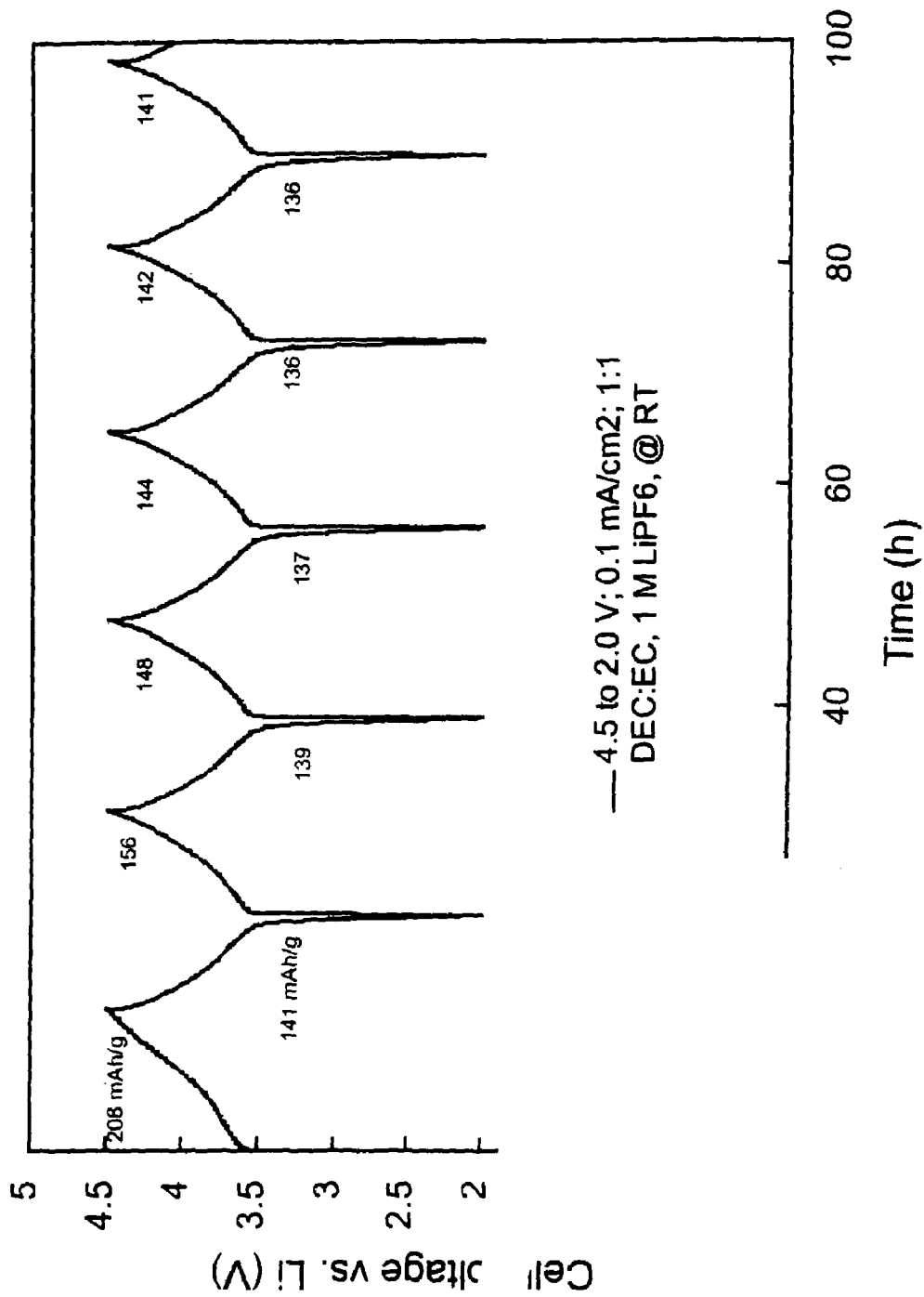
FIG. 7 depicts the electrochemical profile of a $Li/xLi_2MnO_3 \cdot (1-x)LiNi_{0.8}Co_{0.2}O_2$ electrochemical cell.
Figure 8:
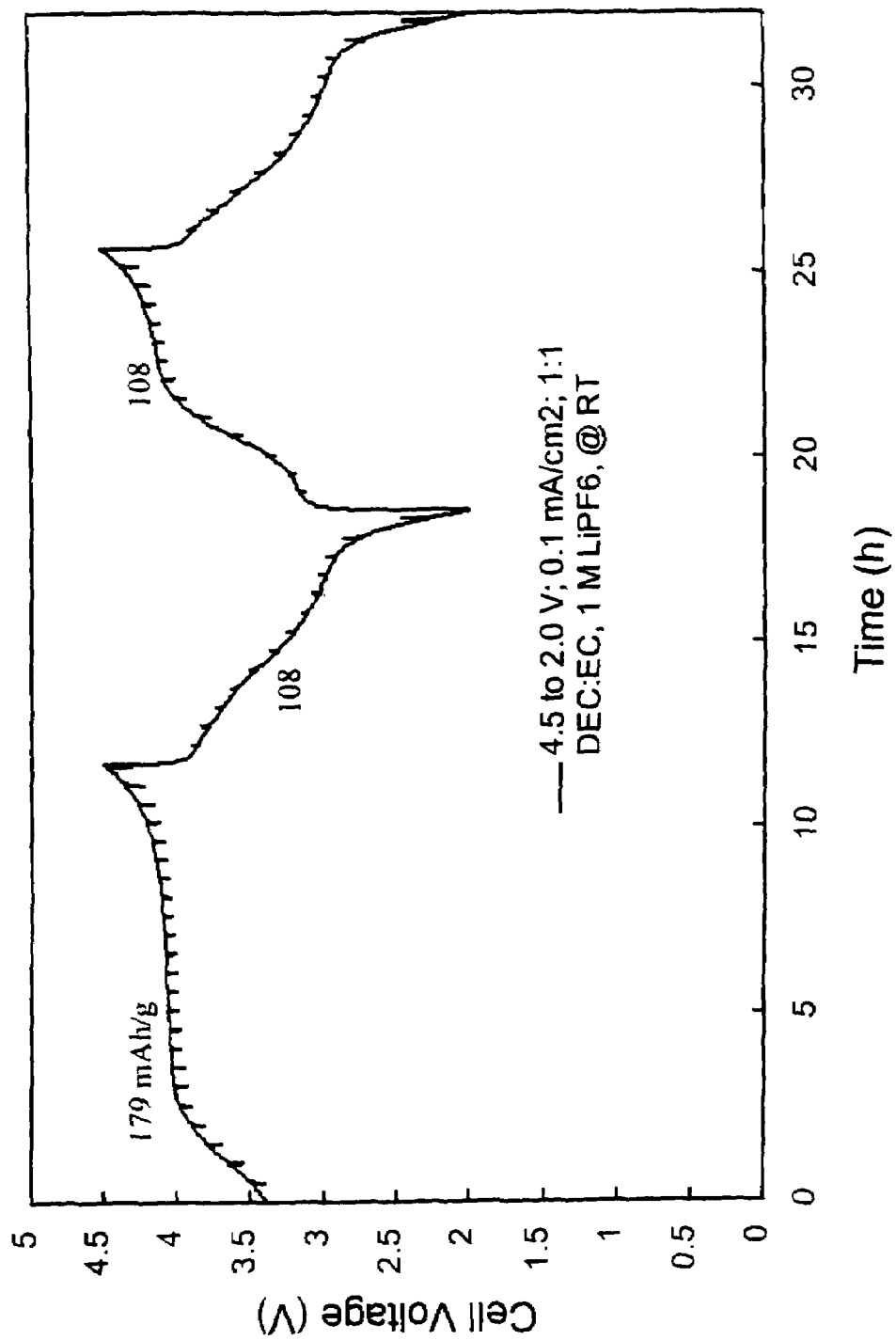
FIG. 8 depicts the electrochemical profile of a $Li/xLi_2TiO_3 \cdot (1-x)LiMnO_2$ electrochemical cell.

Typical electrochemical data for Li/xLiMO$_2$.(1−x)Li$_2$M'O$_3$ cells are provided in various plots, as shown in FIG. 7, a Li/0.2Li$_2$MnO$_3$.0.8LiNi$_{0.8}$Co$_{0.2}$O$_2$ cell; and FIG. 8, a Li/0.15Li$_2$TiO$_3$.0.85LiMnO$_2$ cell. For example, the electrode of Example 1, namely 0.2Li$_2$MnO$_3$.0.8LiNi$_{0.8}$Co$_{0.2}$O$_2$ has a theoretical electrochemical capacity of 212 mAh/g. The electrochemical data in FIG. 7 indicate that an initial capacity of approximately 208 mAh/g can be achieved from this electrode during the 'break-in' process on the initial charge of the cell and, thereafter, a steady rechargeable discharge capacity of approximately 136 mAh/g. For the stabilized 0.15Li$_2$TiO$_3$.0.85LiMnO$_2$ electrode of Example 3, as seen in FIG. 8, a capacity of 179 mAh/g was achieved during the 'break-in' process on the initial charge of the cell, and thereafter a rechargeable capacity of 108 mAh/g was achieved.

EXAMPLE 7

Synthesis and Phase Identification

Figure 9:
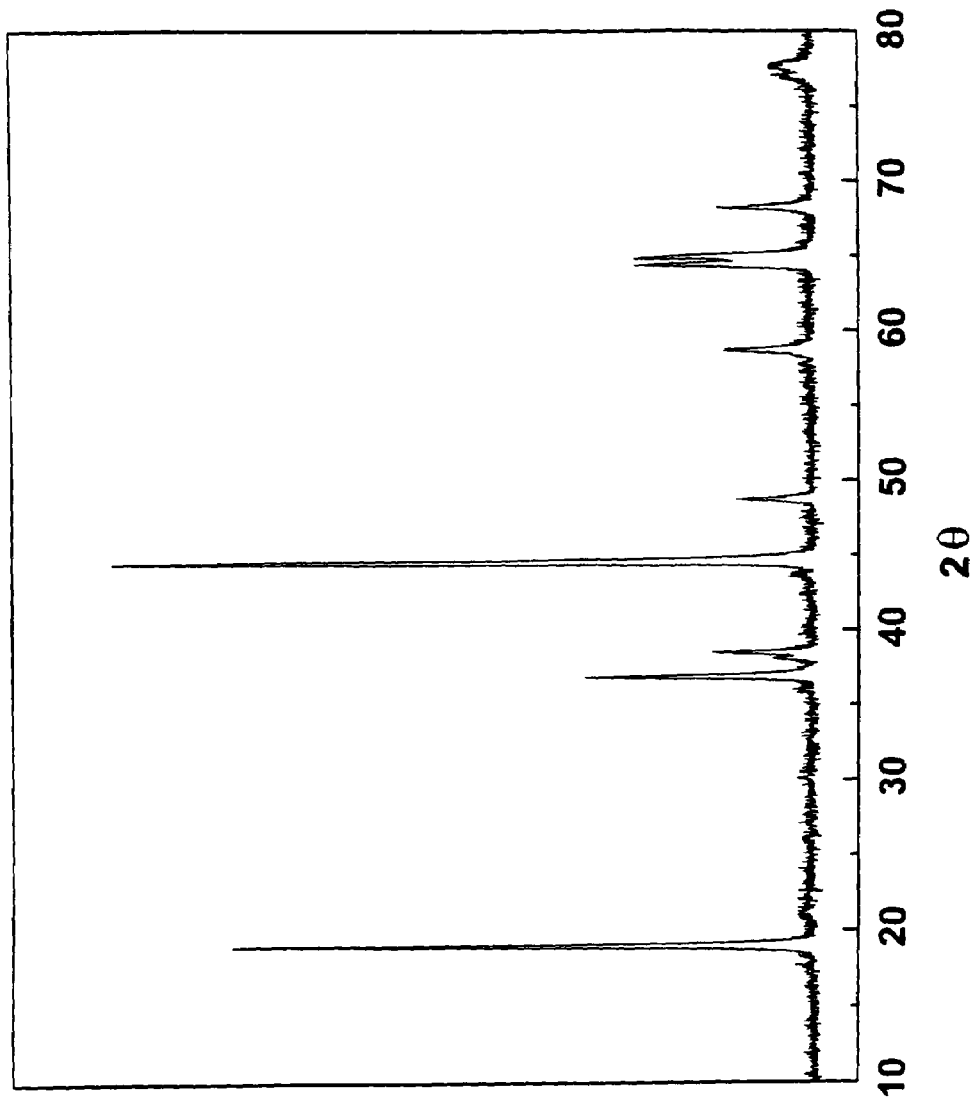
FIG. 9 depicts the X-ray diffraction pattern of a $xLi_2TiO_3 \cdot (1-x)LiNi_{0.5}Mn_{0.5}O_2$ electrode composition.

The material 0.05Li$_2$TiO$_3$.0.95LiNi$_{0.5}$Mn$_{0.5}$O$_2$ that can be written, alternatively, as Li(Li$_{0.02}$Ti$_{0.05}$Ni$_{0.46}$Mn$_{0.46}$)O$_2$ was prepared by the reaction of Ni$_{0.5}$Mn$_{0.5}$(OH)$_2$, Ti[OCH(CH$_3$)$_2$]$_4$, and LiOH in the required stoichiometric amounts at 900° C. in air for about 20 hours. Ni$_{0.5}$Mn$_{0.5}$(OH)$_2$ was prepared by precipitation from Ni(NO$_3$)$_2$ and Mn(NO$_3$)$_2$ in basic solution (NaOH, pH~11). The powder X-ray diffraction pattern of this compound, in which the Ni and Mn ions of the LiNi$_{0.5}$Mn$_{0.5}$O$_2$ component together have an average oxidation state of 3$^+$, indicates an essentially single-phase product with a layered-type structure (FIG. 9). Analysis of the oxidation states of the transition metal ions in the product by x-ray absorption spectroscopy has shown divalent Ni, tetravalent Mn are tetravalent Ti.

Electrochemical Characteristics

The 0.05Li$_2$TiO$_3$.0.95LiNi$_{0.5}$Mn$_{0.5}$O$_2$ electrode material was evaluated in a coin type cell (size 2032) 20 mm diameter and 3.2 mm high against a counter lithium electrode. The cells had the configuration: Li/1M LiPF$_6$ in ethylene carbonate (EC), diethylcarbonate (DEC) (1:1) electrolyte/ 0.05Li$_2$TiO$_3$.0.95LiNi$_{0.5}$Mn$_{0.5}$O$_2$ electrode. Other electrolytes well known in the art may be used. Pellet electrodes were made containing approximately 15 to 20 mg of 0.05Li$_2$TiO$_3$.0.95LiNi$_{0.5}$Mn$_{0.5}$O$_2$ powder, i.e., 85% by weight of the electrode, intimately mixed with approximately 8% by weight of polyvinylidene difluoride (Kynar PVDF polymer binder) and approximately 7% by weight of suitable carbon (i.e. graphite, such as Timcal SFG-6, or acetylene black, such as Chevron XC-72) in 1-methyl-2-pyrrolidinone (NMP). Other binders, well known in the art, may be alternatively used. After intimate mixing, the mixture was dried at 75° C. for about 10 hours, thoroughly ground and pressed into a pellet on an aluminum mesh. The working electrode was dried under vacuum at 70° C. for about 12 hours. Metallic lithium foil was used as the counter electrode. Li/0.05Li$_2$TiO$_3$.0.95LiNi$_{0.5}$Mn$_{0.5}$O$_2$ cells were charged and discharged at constant current (typically 0.1 mA/cm$^2$ or otherwise specified) within the voltage range 2.5 to 4.6 V.

Figure 10:
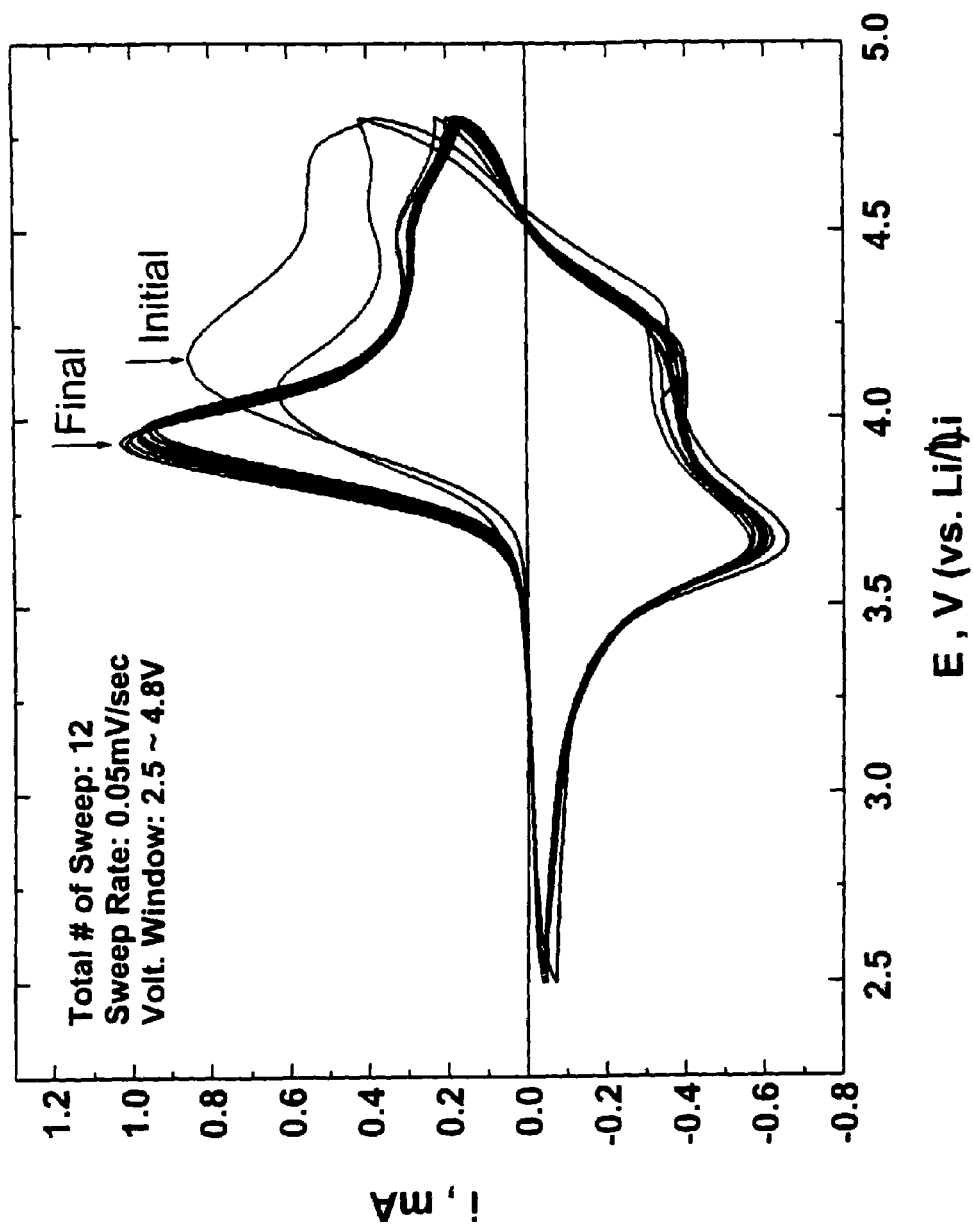
FIG. 10 depicts the cyclic voltammogram of a $xLi_2TiO_3 \cdot (1-x)LiNi_{0.5}Mn_{0.5}O_2$ electrode.
Figure 11:
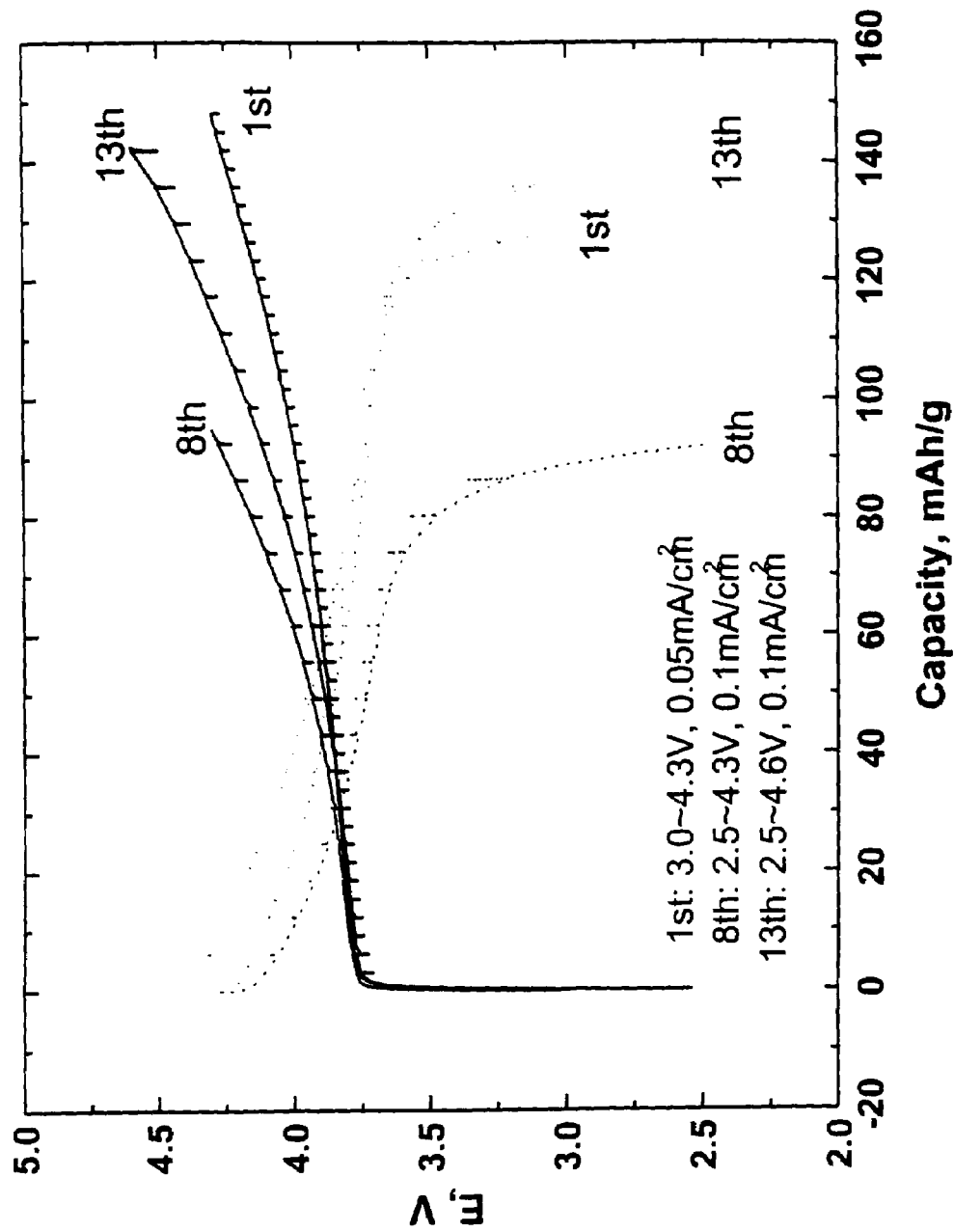
FIG. 11 depicts the electrochemical charge/discharge profiles of a $Li/xLi_2TiO_3 \cdot (1-x)LiNi_{0.5}Mn_{0.5}O_2$ electrochemical cell.
Figure 12:
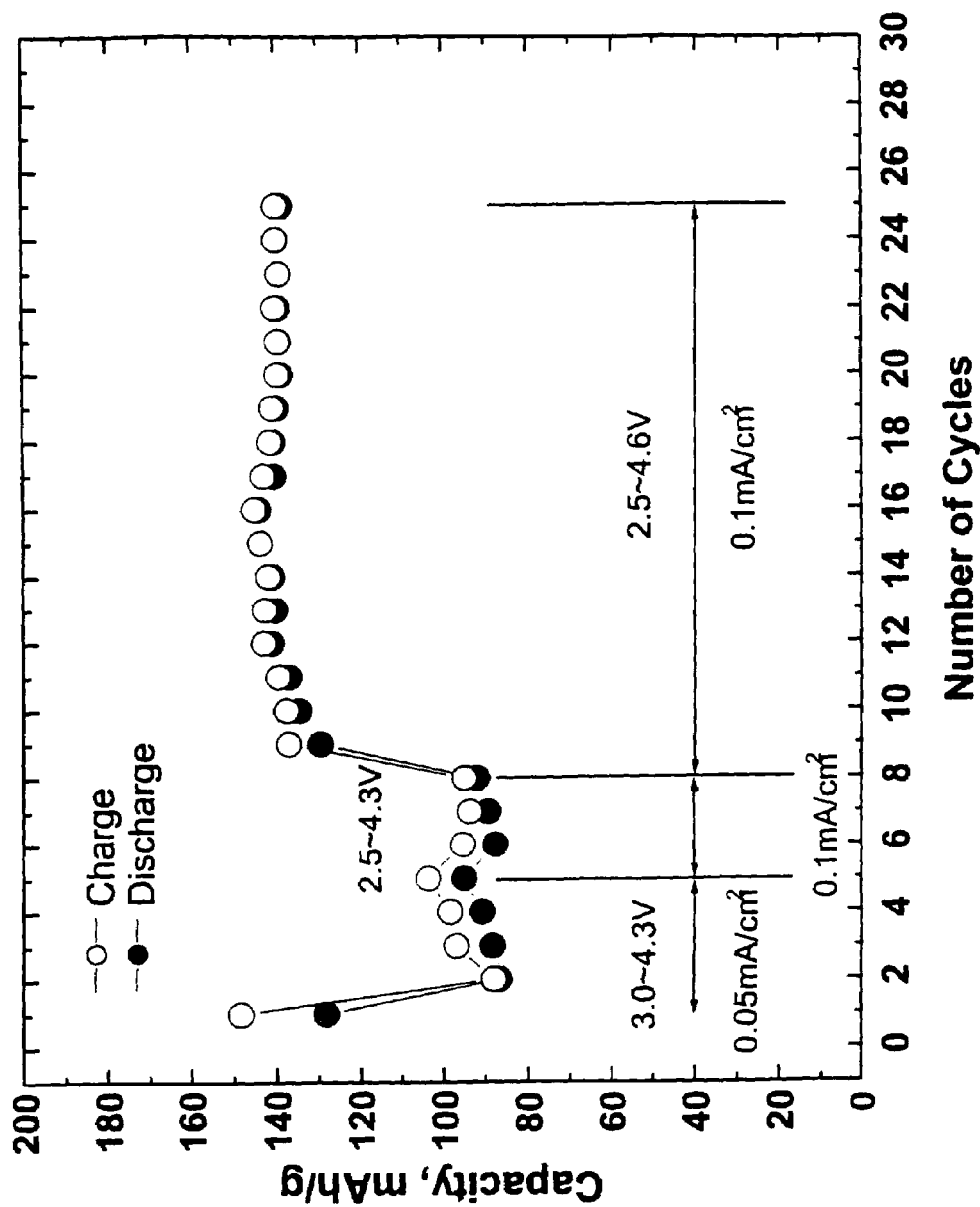
FIG. 12 depicts the capacity versus cycle number plot of a $Li/xLi_2TiO_3 \cdot (1-x)LiNi_{0.5}Mn_{0.5}O_2$ electrochemical cell.

Typical electrochemical data for Li/0.05Li$_2$TiO$_3$.0.95LiNi$_{0.5}$Mn$_{0.5}$O$_2$ cells are provided in various plots. FIG. 10 shows a cyclic voltammogram of the 0.05Li$_2$TiO$_3$.0.95LiNi$_{0.5}$Mn$_{0.5}$O$_2$ electrode, in which wide a voltage window (2.5~4.8 V) was used with a slow sweep rate of 0.05 mV/sec. FIG. 10 demonstrates that the 0.05Li$_2$TiO$_3$.0.95LiNi$_{0.5}$Mn$_{0.5}$O$_2$ electrode is stable over a wide voltage window. Typical voltage profiles the Li/0.05Li$_2$TiO$_3$.0.95LiNi$_{0.5}$Mn$_{0.5}$O$_2$ cell for the 1st, 8th and 13th cycles are shown in FIG. 11. FIG. 12 shows that for the first 8 cycles during which an upper voltage limit of 4.3 V was imposed, the cell delivered a rechargeable capacity of ~90 mAh/g; however, by increasing the upper voltage limit to 4.6 V, there was no indication of capacity loss due to electrode/electrolyte interactions; instead the capacity continued to increase steadily to yield rechargeable capacity of >140 mAh/g which is more than 50% of the theoretical capacity of the 0.05Li$_2$TiO$_3$.0.95LiNi$_{0.5}$Mn$_{0.5}$O$_2$ electrode, thereby demonstrating the excellent stability of the electrode at high potentials.

EXAMPLE 8

Figure 13:
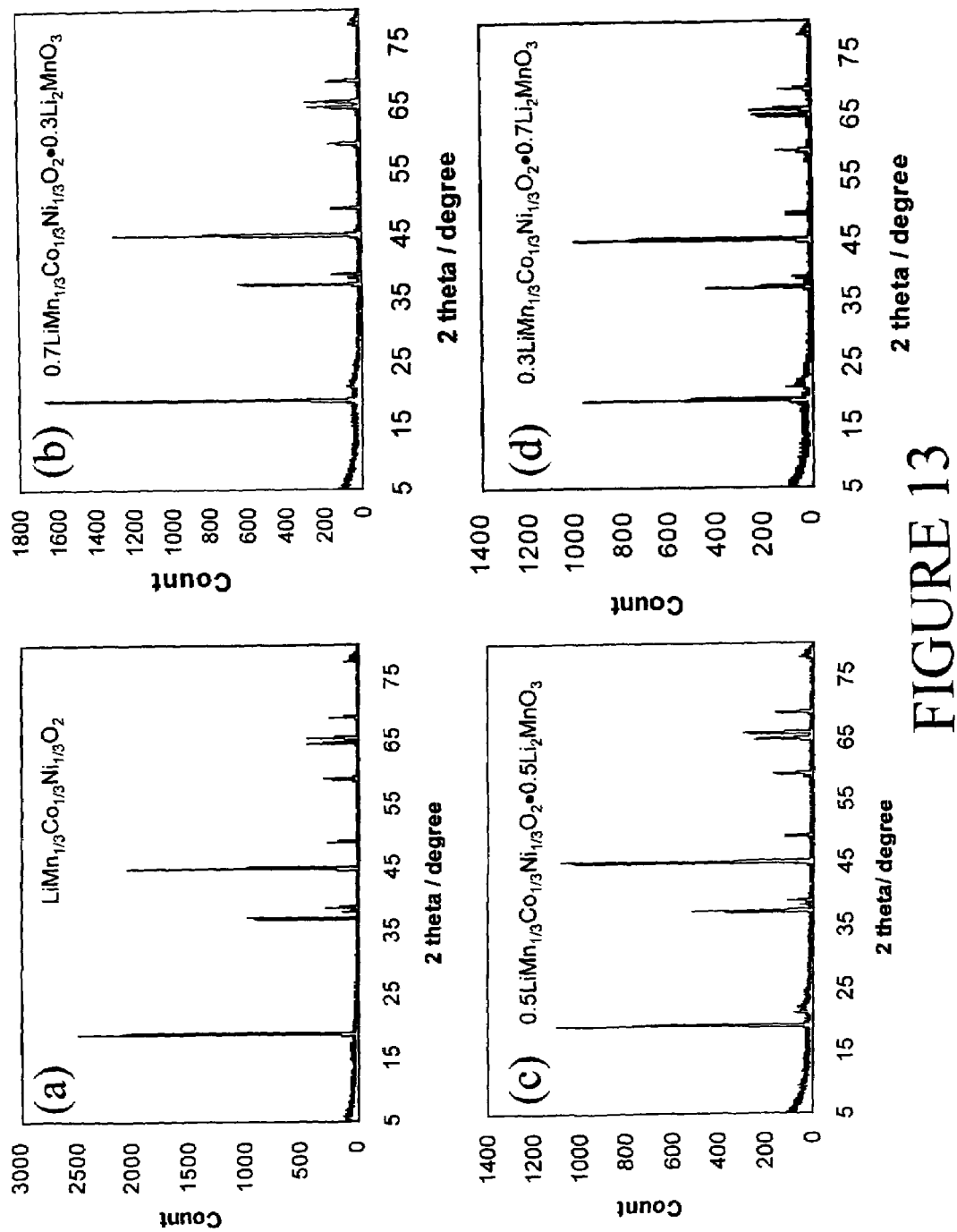
FIG. 13 depicts the X-ray diffraction pattern of a $xLiMn_{1/3}Ni_{1/3}Co_{1/3}O_2 \cdot (1-x)Li_2MnO_3$ electrode powders for a) x=1; b) x=0.7; c) x=0.5; and d) x=0.3.

Positive electrodes falling within the general formula xLiMn$_{1/3}$Ni$_{1/3}$Co$_{1/3}$O$_2$O.(1−x)Li$_2$MnO$_3$ for the range $0.3 < x \leq 1.0$ were prepared as follows: Lithium hydroxide hydrate (LiOH.H$_2$O) and manganese-nickel-cobalt double hydroxide precursors were reacted using the required amounts of Mn, Ni, Co and Li for a given value of x. Table 1 shows the approximate ratio of Mn:Ni:Co in the manganese-nickel-cobalt hydroxide precursors required to synthesize xLiMn$_{1/3}$Ni$_{1/3}$Co$_{1/3}$O$_2$.1−xLi$_2$MnO$_3$ products for x=1, 0.7, 0.5 and 0.3. The transition metal hydroxide precursors were prepared by co-precipitation of the required hydrated metal nitrate salts, Mn(NO$_3$)$_2$.4H$_2$O, Ni(NO$_3$)$_2$.6H$_2$O, Co(NO$_3$)$_2$.6H$_2$O, under basic conditions with lithium hydroxide hydrate (LiOH.H$_2$O) in water at room-temperature to 50° C. The pH was adjusted to around 11 during the precipitation reaction by addition of ammonium hydroxide (NH$_4$OH) solution. Precipitates were isolated by vacuum filtration and washed multiple times with distilled de-ionized water. The hydroxide precipitate was intimately mixed with LiOH.H$_2$O and then fired first in air between 300-500° C. for 3-6 hours, then again as a pellet between 800-1000° C. in air for 3-5 h. The products were cooled to room temperature in the box furnace. The X-ray diffraction pattern of products prepared at 900° C. for LiMn$_{1/3}$Ni$_{1/3}$Co$_{1/3}$O$_2$ (x=1); 0.7LiMn$_{1/3}$Ni$_{1/3}$Co$_{1/3}$O$_2$.0.3Li$_2$MnO$_3$ (x=0.7); 0.5LiMn$_{1/3}$Ni$_{1/3}$Co$_{1/3}$O$_2$.0.5Li$_2$MnO$_3$ (x=0.5); and 0.3LiMn$_{1/3}$Ni$_{1/3}$Co$_{1/3}$O$_2$.0.7Li$_2$MnO$_3$ (x=0.3) are shown in FIGS. 13(a-d), respectively. The X-ray diffraction patterns show unequivocal evidence of increasing amounts of the Li$_2$MnO$_3$ component in the composite structure as x decreases, as indicated by the increasing intensity of the weak peaks at approximately 21-23° 2θ.

TABLE 1

Approximate Stoichiometry of Metal Hydroxide Precursor and Products

| Material | x | Metal Hydroxide Composition (y~2) |
|---|---|---|
| LiMn$_{1/3}$Ni$_{1/3}$Co$_{1/3}$O$_2$ | 1 | Mn$_{1/3}$Ni$_{1/3}$Co$_{1/3}$(OH)$_y$ |
| 0.7LiMn$_{1/3}$Ni$_{1/3}$Co$_{1/3}$O$_2$·0.3Li$_2$MnO$_3$ | 0.7 | Mn$_{0.534}$Ni$_{0.233}$Co$_{0.233}$(OH)$_y$ |
| 0.5LiMn$_{1/3}$Ni$_{1/3}$Co$_{1/3}$O$_2$·0.5Li$_2$MnO$_3$ | 0.5 | Mn$_{0.666}$Ni$_{0.167}$Co$_{0.167}$(OH)$_y$ |
| 0.3LiMn$_{1/3}$Ni$_{1/3}$Co$_{1/3}$O$_2$·0.7Li$_2$MnO$_3$ | 0.3 | Mn$_{0.800}$Ni$_{0.100}$Co$_{0.100}$(OH)$_y$ |

The xLiMn$_{1/3}$Ni$_{1/3}$Co$_{1/3}$O$_2$.(1−x)Li$_2$MnO$_3$ electrode materials were evaluated in coin type cells (size 2032) 20 mm diameter and 3.2 mm high against a counter lithium electrode. The cells had the configuration: Li/1M LiPF$_6$ in ethylene carbonate (EC), diethylcarbonate (DEC) (1:1) electrolyte/ xLiMn$_{1/3}$Ni$_{1/3}$Co$_{1/3}$O$_2$.(1-x)Li$_2$MnO$_3$ electrode. Other electrolytes well known in the art may be used. Laminate electrodes were made by casting a slurry of xLiMn$_{1/3}$Ni$_{1/3}$Co$_{1/3}$O$_2$.(1-x)Li$_2$MnO$_3$ powder containing 85% by weight of the active electrode, intimately mixed with approximately 8% by weight of polyvinylidene difluoride (Kynar PVDF polymer binder) and approximately 7% by weight of suitable carbon (i.e. graphite, such as Timcal SFG- and/or acetylene black, such as Chevron XC-72) in 1-methyl-2-pyrrolidinone (NMP). Other binders, well known in the art, may be alternatively used. After intimate mixing, the slurry was cast on an aluminum foil and dried at 75° C. for about 10 hours. The working electrode was dried under vacuum at 70° C. for about 12 hours. Metallic lithium foil was used as the counter electrode. Li/xLiMn$_{1/3}$Ni$_{1/3}$Co$_{1/3}$O$_2$.(1-x)Li$_2$MnO$_3$ cells were charged and discharged at current rates between C/24 to C/3 within the voltage range 4.6 to 2.0 V.

Electrochemical Results

Figure 14:
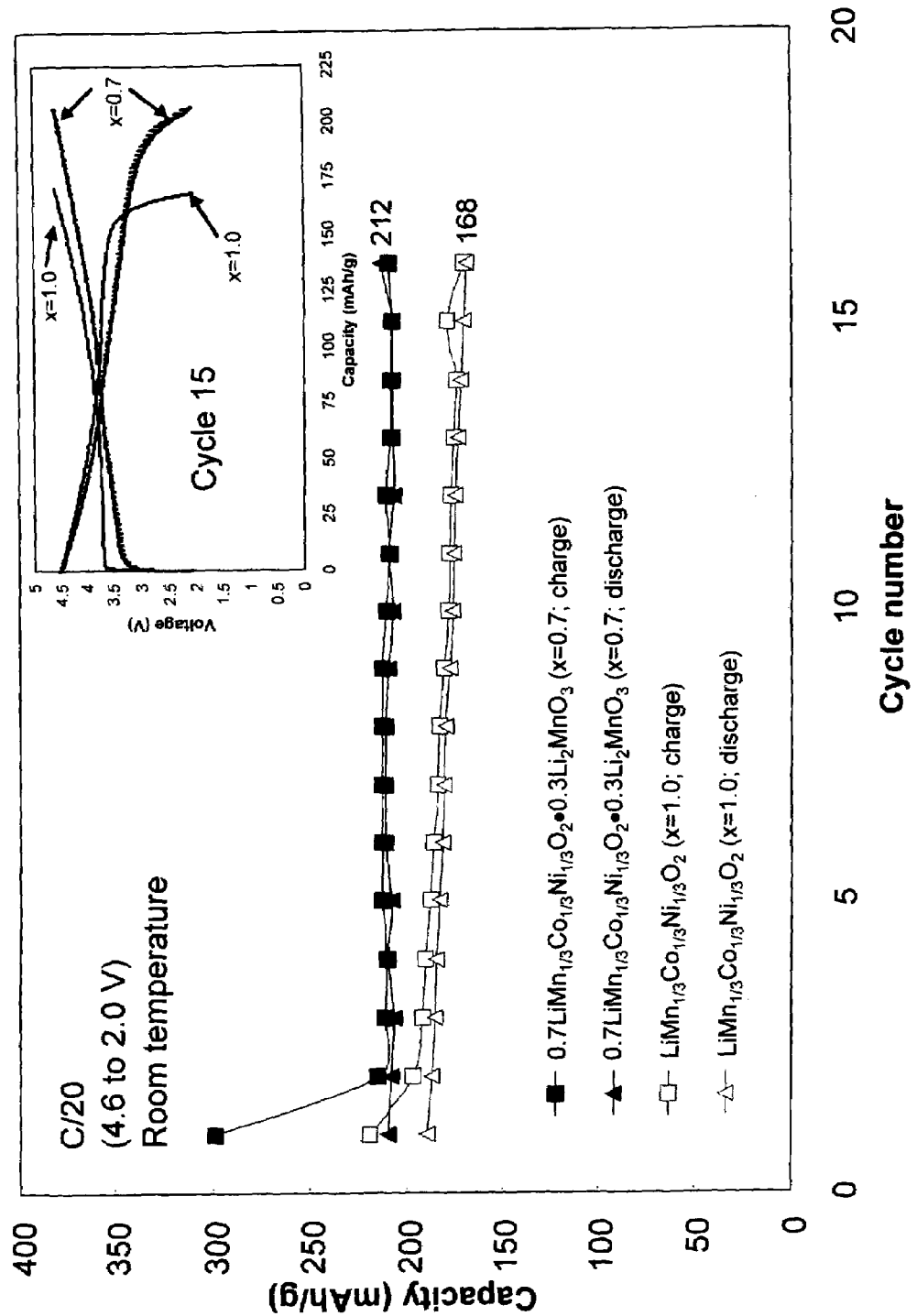
FIG. 14 depicts the charge and discharge voltage profiles of an electrochemical control cell, $Li/LiMn_{1/3}Ni_{1/3}Co_{1/3}O_2$, and a $0.7LiMn_{1/3}Ni_{1/3}Co_{1/3}O_2 \cdot 0.3Li_2MnO_3$ electrochemical cell operated at room temperature and recorded on the $15^{th}$ cycle at a C/20 rate between 4.6 and 2.0 V, and capacity vs. cycle number plots for the first 16 cycles.

Electrochemical data obtained from xLiMn$_{1/3}$Ni$_{1/3}$Co$_{1/3}$O$_2$.(1-x)Li$_2$MnO$_3$ composite structures demonstrate unequivocally their utility in lithium cells. The charge and discharge voltage profiles of an electrochemical control cell, Li/LiMn$_{1/3}$Ni$_{1/3}$Co$_{1/3}$O$_2$ (x=1), and a Li/0.7LiMn$_{1/3}$Ni$_{1/3}$Co$_{1/3}$O$_2$0.3Li$_2$MnO$_3$ (x=0.7) electrochemical cell operated at room temperature and recorded on the 15$^{th}$ cycle at a C/20 rate between 4.6 and 2.0V, and capacity vs. cycle number plots for the first 16 cycles are shown in FIG. 14. The data clearly show that the composite electrode structure 0.7LiMn$_{1/3}$Ni$_{1/3}$Co$_{1/3}$O$_2$0.3Li$_2$MnO$_3$ provides significantly higher and stable rechargeable capacity (212 mAh/g after 16 cycles) than a conventional layered LiMn$_{1/3}$Ni$_{1/3}$Co$_{1/3}$O$_2$ electrode structure (168 mAh/g after 16 cycles), which is in excess of a 26% increase in capacity, despite the high Mn content introduced by the Li$_2$MnO$_3$ component.

Figure 15:
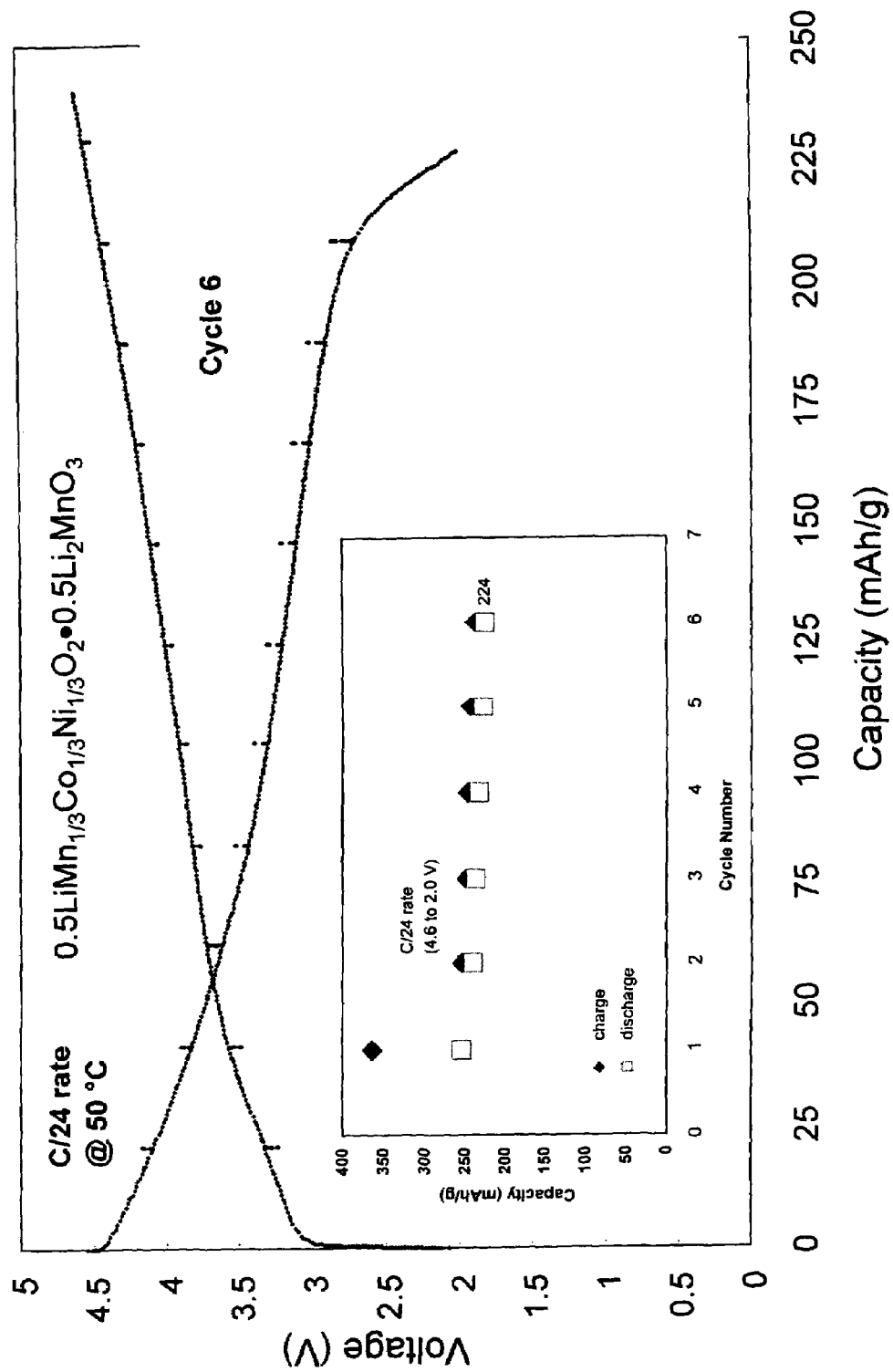
FIG. 15 depicts the charge and discharge voltage profiles of a $0.5LiMn_{1/3}Ni_{1/3}Co_{1/3}O_2 \cdot 0.5Li_2MnO_3$ electrochemical cell operated at 50° C., recorded on the $6^{th}$ cycle at a C/24 rate between 4.6 and 2.0 V, and capacity vs. cycle number plots for the first 6 cycles.
Figure 16:
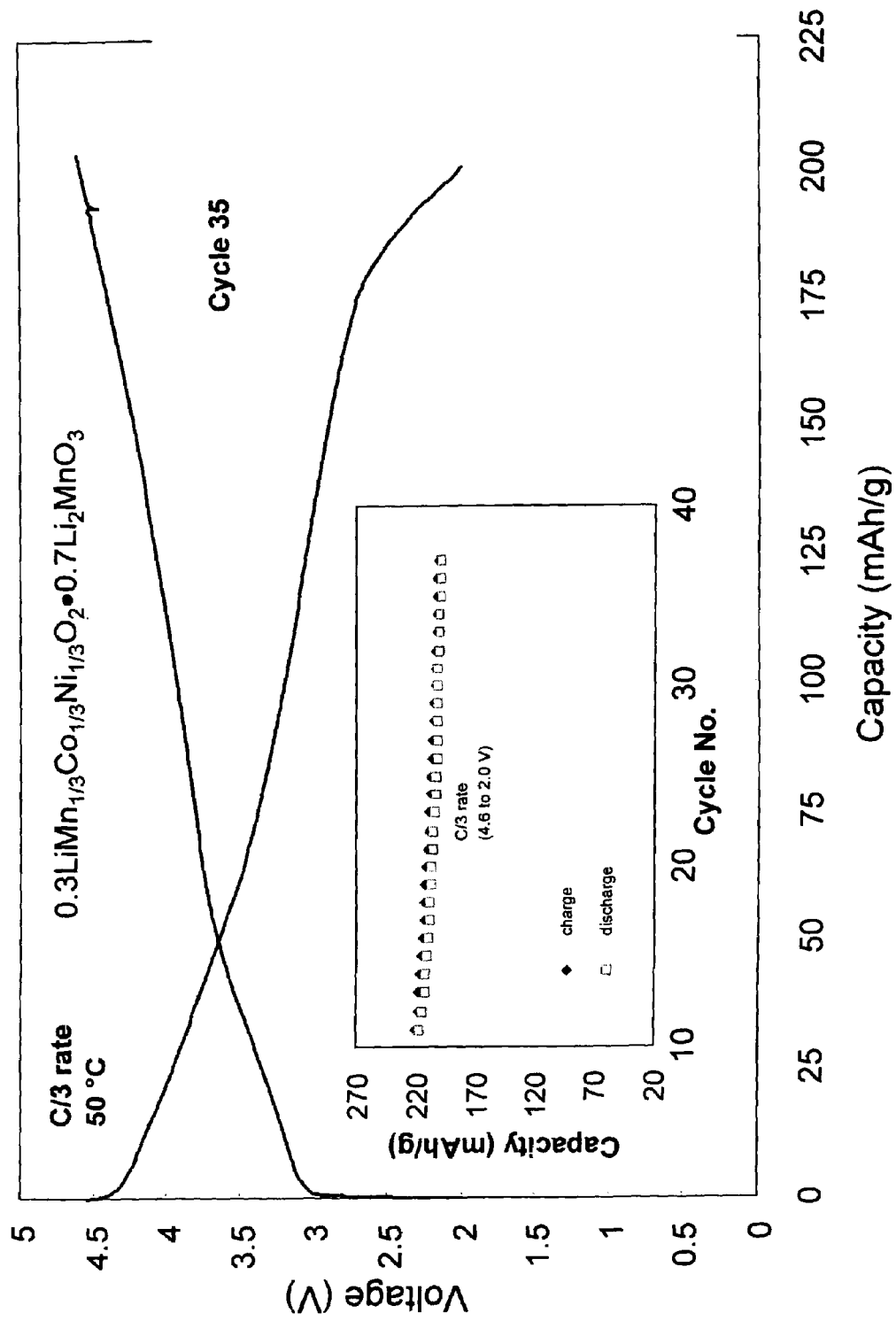
FIG. 16 depicts the charge and discharge voltage profiles of a $0.3LiMn_{1/3}Ni_{1/3}Co_{1/3}O_2 \cdot 0.7Li_2MnO_3$ electrochemical cell operated at 50° C., recorded at the $35^{th}$ cycle at a C/3 rate between 4.6 and 2.0 V, and capacity vs. cycle number plots for cycles 10 to 37.

FIG. 15 shows the charge and discharge voltage profiles of a Li/0.5LiMn$_{1/3}$Ni$_{1/3}$Co$_{1/3}$O$_2$.0.5Li$_2$MnO$_3$ (x=0.5) electrochemical cell operated at 50° C., recorded on the 6$^{th}$ cycle at a C/24 rate between 4.6 and 2.0 V, and capacity vs. cycle number plots for the first 6 cycles. The data provide further evidence that rechargeable capacities in excess of 200 mAh/g are achievable from xLiMn$_{O/3}$Ni$_{1/3}$Co$_{1/3}$O$_2$.(1-x) Li$_2$MnO$_3$ electrodes. Increasing the current rate to C/3 does not significantly affect the performance of the electrode. For example, FIG. 16 demonstrates that, at a C/3 rate, a 0.3LiMn$_{1/3}$Ni$_{1/3}$Co$_{1/3}$O$_2$.0.7Li$_2$MnO$_3$ electrode can still deliver 200 mAh/g for 25 cycles at 50° C. after being preconditioned in a lithium cell at a slow C/35 rate for the first 310 cycles between 4.6 and 2.0 V (at the same temperature).

The data in the examples provided above indicate that the principle of this invention can be used to stabilize LiMO$_2$ compounds with a Li$_2$M'O$_3$ component, and specifically those containing M=Ni and/or Mn that are of major significance and interest to the lithium battery industry for replacing the lithium-cobalt-oxide, LiCoO$_2$, as the electrode of choice, thereby reducing cost. The performance and effectiveness of the xLiMO$_2$.(1-x)Li$_2$MO$_3$ electrodes (0<x<1) of this invention depend on the concentration of the trivalent transition metal ions, M, in the structure, that is the value of "x" which preferably is equal to or greater than 0.8 and less than 1. A major advantage of the compounds of this invention is that the concentration of the M ions with an average trivalent oxidation state, the concentration of stabilizing M' ions with an average tetravalent oxidation state, and concentration of monovalent lithium ions can be tailored in such a way to extend and optimize both the capacity of the electrode as well as the stabilizing effect of the Li$_2$M'O$_3$ component in the structure. For example, an electrode with the composition 0.9LiMn$_{0.9}$Ni$_{0.1}$O$_2$.0.1Li$_2$TiO$_3$ (alternatively Li$_{1.2}$Mn$_{0.72}$Ni$_{0.08}$Ti$_{0.2}$O$_{2.2}$) has a theoretical capacity of 252 mAh/g, which is only 8% less than that of LiCoO$_2$ used in state-of-the-art lithium cells.

Figure 17:
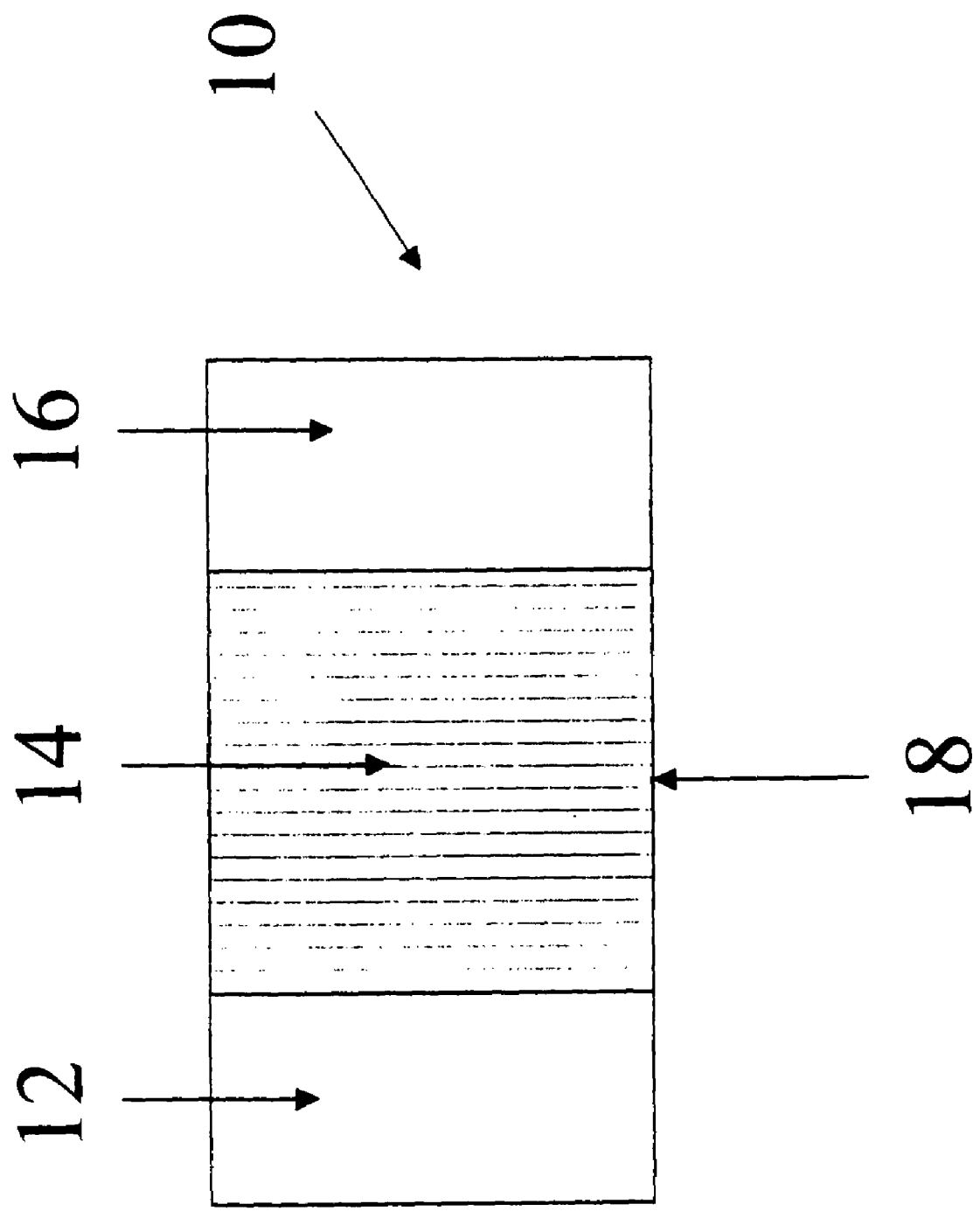
FIG. 17 depicts a schematic representation of an electrochemical cell.
Figure 18:
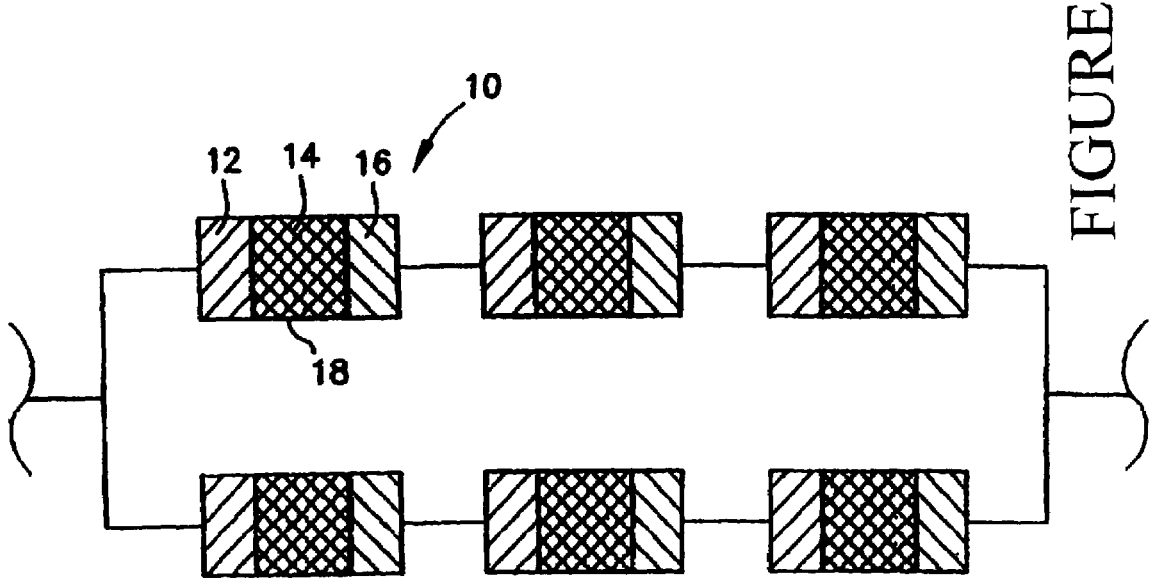
FIG. 18 depicts a schematic representation of a battery consisting of a plurality of cells connected electrically in series and in parallel.

This invention, therefore, relates to a lithium-metal-oxide positive electrode for a non-aqueous electrochemical lithium cell as shown schematically in FIG. 17, the cell represented by the numeral 10 having a negative electrode 12 separated from a positive electrode 16 by an electrolyte 14, all contained in an insulating housing 18 with suitable terminals (not shown) being provided in electronic contact with the negative electrode 12 and the positive electrode 16. Binders and other materials normally associated with both the electrolyte and the negative and positive electrodes are well known in the art and are not described herein, but are included as is understood by those of ordinary skill in this art. FIG. 18 shows a schematic illustration of one example of a battery in which two strings of electrochemical lithium cells, described above, are arranged in parallel, each string comprising three cells arranged in series.

While particular embodiments of the present invention have been shown and described, it will be appreciated by those skilled in the art that changes and modifications may be made without departing from the invention in its broader aspects. Therefore, the aim in the appended claims is to cover all such changes and modifications as fall within the true spirit and scope of the invention.

The embodiments of the invention in which an exclusive property or privilege is claimed are defined as follows:

1. A lithium metal oxide positive electrode for a non-aqueous lithium cell prepared in its initial discharged state having a general formula xLiMO$_2$.(1-x) Li$_2$M'O$_3$ in which 0<x<1, and where M is three or more ions including Mn, Co, and Ni with an average oxidation state of three, wherein the Mn:Ni:Co ratio is 1:1:1, M' is one or more ions having an average oxidation state of four, with both the LiMO$_2$ and Li$_2$M'O$_3$ components being layered, and the ratio of Li to M and M' is greater than one and less than two.

2. The lithium metal oxide positive electrode according to claim 1 having a general formula xLiMn$_{1/3}$Ni$_{1/3}$Co$_{1/3}$O$_2$.(1-x)Li$_2$MnO$_3$.

* * * * *